US011184637B2

(12) United States Patent
Li et al.

(10) Patent No.: US 11,184,637 B2
(45) Date of Patent: Nov. 23, 2021

(54) ENCODING/DECODING WITH FLAGS TO INDICATE SWITCHING OF COLOR SPACES, COLOR SAMPLING RATES AND/OR BIT DEPTHS

(71) Applicant: Microsoft Technology Licensing, LLC, Redmond, WA (US)

(72) Inventors: Bin Li, Beijing (CN); Jizheng Xu, Beijing (CN); Feng Wu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/850,847

(22) Filed: Apr. 16, 2020

(65) Prior Publication Data

US 2020/0244991 A1 Jul. 30, 2020

Related U.S. Application Data

(63) Continuation of application No. 16/126,325, filed on Sep. 10, 2018, now Pat. No. 10,666,975, which is a
(Continued)

(51) Int. Cl.
*H04N 19/59* (2014.01)
*H04N 19/176* (2014.01)
(Continued)

(52) U.S. Cl.
CPC .......... *H04N 19/59* (2014.11); *H04N 19/117* (2014.11); *H04N 19/13* (2014.11); *H04N 19/132* (2014.11);
(Continued)

(58) Field of Classification Search
CPC ........ H04N 19/59; H04N 19/82; H04N 19/13; H04N 19/88; H04N 19/176; H04N 19/117;
(Continued)

(56) References Cited

U.S. PATENT DOCUMENTS 7,454,055 B1 11/2008 Payton
10,681,375 B2 6/2020 Li et al.
(Continued)

FOREIGN PATENT DOCUMENTS

CN 1664862 9/2005

OTHER PUBLICATIONS

Communication under Rule 71(3) EPC dated Nov. 19, 2019, from European Patent Application No. 14885039.9, 5 pp.
(Continued)

*Primary Examiner* — Marnie A Matt
(74) *Attorney, Agent, or Firm* — Klarquist Sparkman, LLP

(57) ABSTRACT

Innovations in adaptive encoding and decoding for units of a video sequence can improve coding efficiency. For example, some of the innovations relate to encoding/decoding that includes adaptive switching of color spaces between units within a video sequence. Other innovations relate encoding/decoding that includes adaptive switching of color sampling rates between units within a video sequence. Still other innovations relate encoding/decoding that includes adaptive switching of bit depths between units within a video sequence.

20 Claims, 11 Drawing Sheets

Related U.S. Application Data continuation of application No. 15/029,242, filed as application No. PCT/CN2014/072847 on Mar. 4, 2014, now Pat. No. 10,171,833.

(51) Int. Cl.

| | | |
|---|---|---|
| *H04N 19/117* | (2014.01) | |
| *H04N 19/132* | (2014.01) | |
| *H04N 19/186* | (2014.01) | |
| *H04N 19/157* | (2014.01) | |
| *H04N 19/587* | (2014.01) | |
| *H04N 19/82* | (2014.01) | |
| *H04N 19/13* | (2014.01) | |
| *H04N 19/88* | (2014.01) | |
| *H04N 19/172* | (2014.01) | |
| *H04N 19/61* | (2014.01) | |
| *H04N 19/70* | (2014.01) | |

(52) U.S. Cl.
CPC ......... *H04N 19/157* (2014.11); *H04N 19/176* (2014.11); *H04N 19/186* (2014.11); *H04N 19/587* (2014.11); *H04N 19/82* (2014.11); *H04N 19/88* (2014.11); *H04N 19/172* (2014.11); *H04N 19/61* (2014.11); *H04N 19/70* (2014.11)

(58) Field of Classification Search
CPC .. H04N 19/132; H04N 19/186; H04N 19/157; H04N 19/587; H04N 19/172; H04N 19/61; H04N 19/70; H04N 19/147
USPC ...................................... 375/240.02
See application file for complete search history.

(56) References Cited

U.S. PATENT DOCUMENTS

| | | | |
|---|---|---|---|
| 2005/0152597 A1 | 7/2005 | Spaulding et al. | |
| 2005/0259730 A1* | 11/2005 | Sun ..................... | H04N 19/176 375/240.03 |
| 2006/0291720 A1 | 12/2006 | Malvar et al. | |
| 2009/0168894 A1* | 7/2009 | Marpe .................. | H04N 19/115 375/240.24 |
| 2010/0128786 A1 | 5/2010 | Gao et al. | |
| 2011/0262037 A1* | 10/2011 | Ohnishi ................ | H04N 19/40 382/166 |
| 2012/0026394 A1 | 2/2012 | Maruyama | |
| 2012/0249810 A1 | 10/2012 | Sato et al. | |
| 2013/0083855 A1* | 4/2013 | Kottke ................... | H04N 19/85 375/240.18 |
| 2014/0072057 A1* | 3/2014 | Tourapis ................ | H04N 19/86 375/240.25 |
| 2014/0092960 A1* | 4/2014 | MacInnis ............. | H04N 19/124 375/240.03 |
| 2014/0301478 A1* | 10/2014 | Deshpande ............ | H04N 19/46 375/240.25 |
| 2014/0355897 A1* | 12/2014 | Tourapis .............. | H04N 19/186 382/233 |
| 2014/0376611 A1* | 12/2014 | Kim ..................... | H04N 19/186 375/240.02 |
| 2016/0073114 A1 | 3/2016 | Kawamura et al. | |
| 2020/0169732 A1 | 5/2020 | Li et al. | |
| 2020/0244992 A1 | 7/2020 | Li et al. | |
| 2020/0267395 A1 | 8/2020 | Li et al. | |
| 2021/0168366 A1 | 6/2021 | Li et al. | |

OTHER PUBLICATIONS

Communication under Rule 71(3) EPC dated Apr. 17, 2020, from European Patent Application No. 19179997.2, 7 pp.
Communication under Rule 71(3) EPC dated May 29, 2020, from European Patent Application No. 14886682.5, 7 pp.
Examiner's Report dated Feb. 17, 2020, from Canadian Patent Application No. 2,939,434, 4 pp.
First Examination Report dated May 1, 2020, from Indian Patent Application No. 201647032651, 6 pp.
First Examination Report dated May 5, 2020, from Indian Patent Application No. 201647028729, 6 pp.
Further Examination Report dated Feb. 24, 2020, from New Zealand Patent Application No. 723358, 2 pp.
Notice of Allowance dated Jan. 17, 2020, from U.S. Appl. No. 16/140,034, 6 pp.
Notice of Allowance dated May 11, 2020, from Canadian Patent Application No. 2,940,015, 1 p.
Office Action dated May 29, 2020, from U.S. Appl. No. 16/774,547, 12 pp.
Office Action dated Jan. 13, 2020, from Indonesian Patent Application No. P00201605889, 4 pp.
Office Action dated Jan. 17, 2020, from Malaysian Patent Application No. PI2016703216, 3 pp.
Office Action dated May 25, 2020, from Brazilian Patent Application No. BR112016019297-4, 5 pp.
Office Action dated May 27, 2020, from Brazilian Patent Application No. BR112016021529-0, 5 pp.
Mavridis et al., "The Compact YCoCg Frame Buffer," *Journal of Computer Graphics Techniques*, vol. 1, No. 1, pp. 19-35 (Jan. 2012).
Notice of Allowance dated Oct. 19, 2020, from Korean Patent Application No. 10-2016-7027275, 8 pp.
Notice of Allowance dated Oct. 26, 2020, from U.S. Appl. No. 16/774,547, 6 pp.
Office Action dated Nov. 4, 2020, from U.S. Appl. No. 16/867,198, 5 pp.
Stern et al., "Adaptive Color Space Switching for Face Tracking in Multi-Colored Lighting Environments," IEEE Int'l Conf, on Automatic Face and Gesture Recognition, 6 pp. (Jan. 2002).
Liu et al., "Research on Color Snow Transformation in Lossless and Nearly Lossless Image Compression," Advanced Television Engineering, pp. 97-99 (Jun. 2006). [with English-language abstract].
Notice of Allowance dated Nov. 9, 2020, from Korean Patent Application No. 10-2016-7029796, 7 pp.
Notice of Allowance dated Nov. 25, 2020, from Canadian Patent Application No. 2,939,434, 1 p.
Notice of Allowance dated Apr. 20, 2021, from U.S. Appl. No. 16/867,198, 10 pp.
Notice on Grant of Patent dated Jun. 10, 2021, from Chinese Patent Application No. 201910954186.7, 4 pp.
Notice on the First Office Action dated Mar. 30, 2021, from Chinese Patent Application No. 201910954186.7, 14 pp.
Office Action dated Mar. 3, 2021, from U.S. Appl. No. 16/851,886, 17 pp.

\* cited by examiner software 180 implementing one or more innovations for adaptive switching of color spaces, color sampling rates and/or bit depths

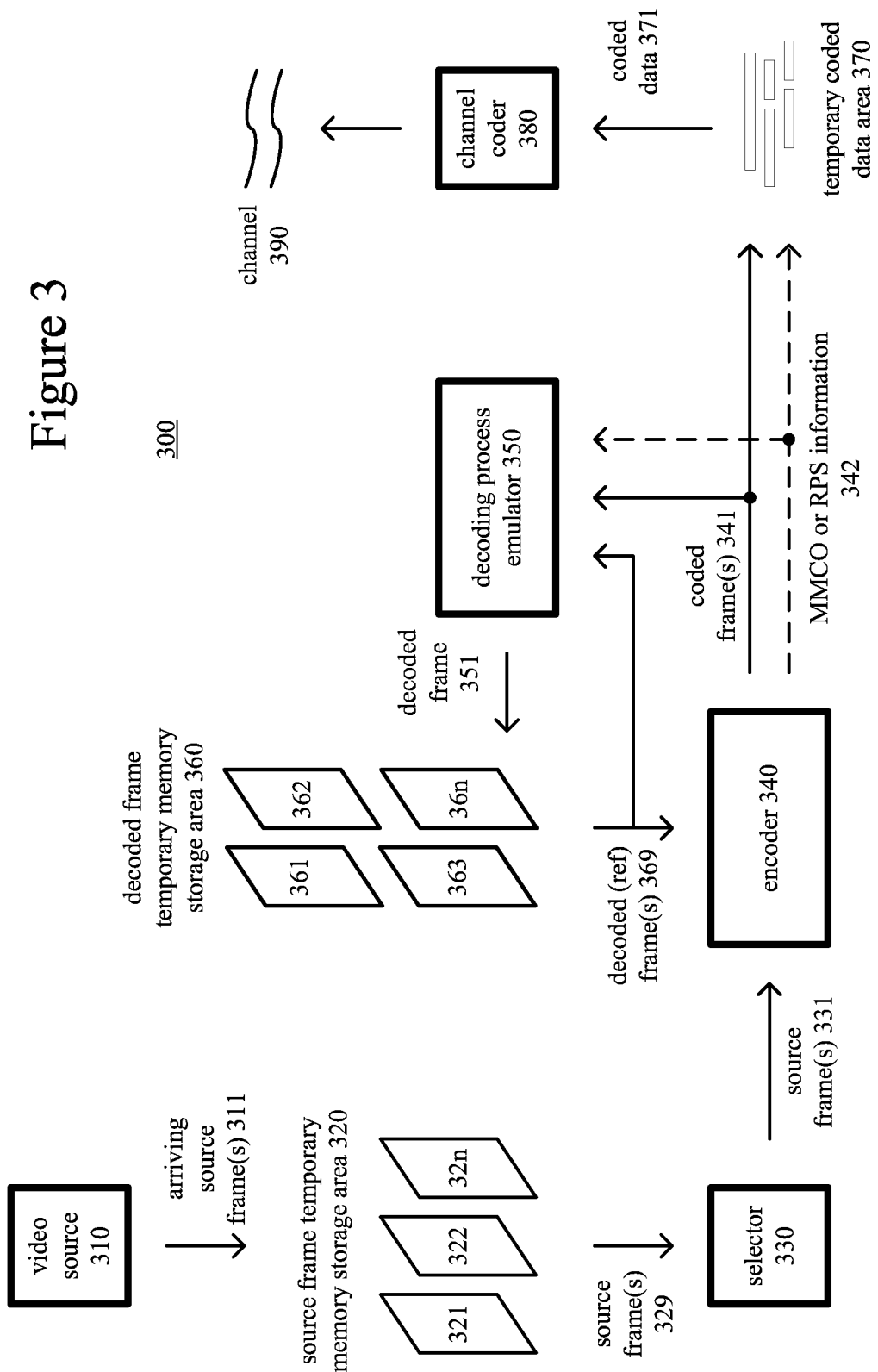

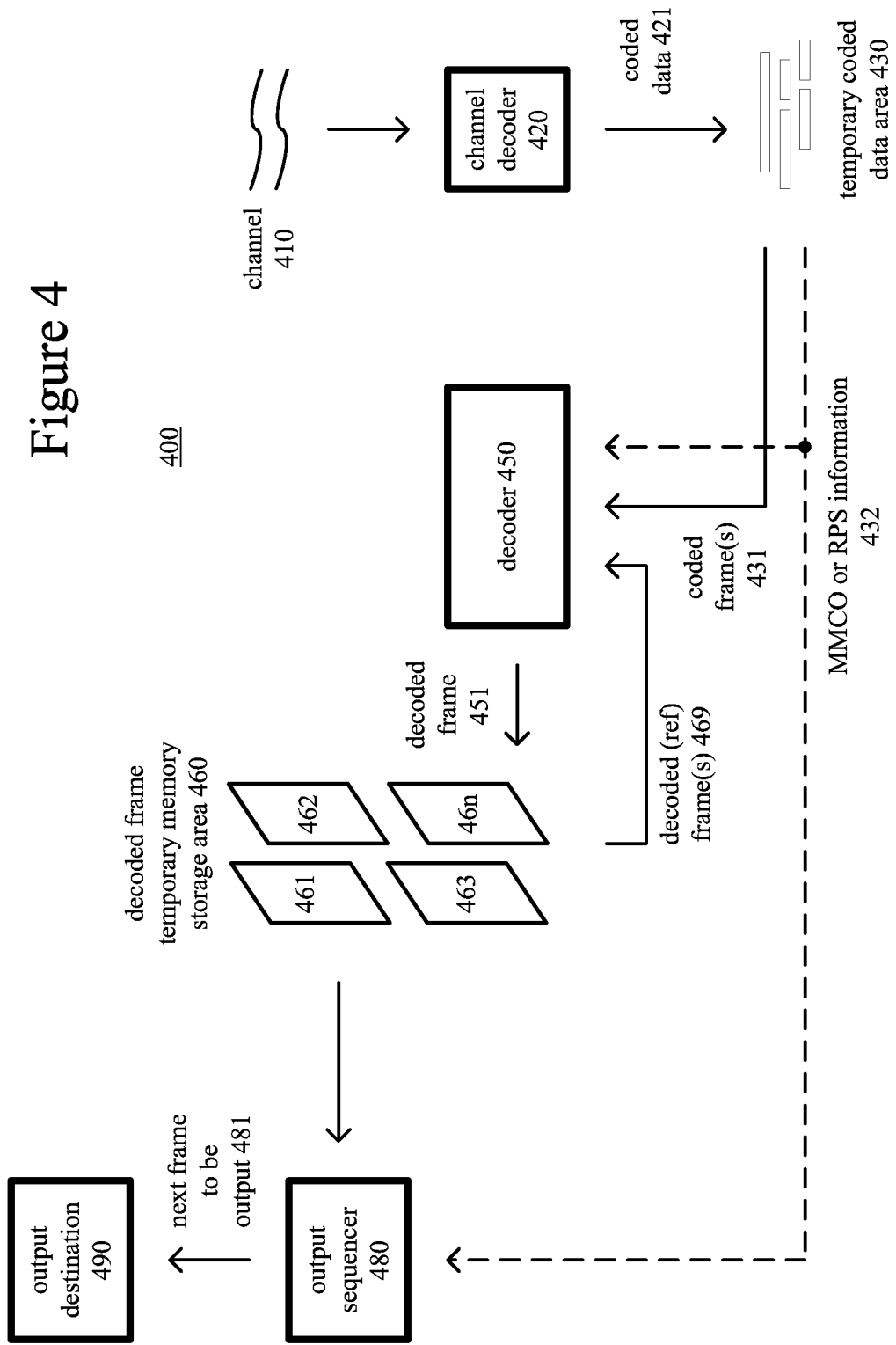

500

600 computer desktop environment (710) with content that may provide input for screen capture composite video (820) with natural video content and palette-based content picture-adaptive color space, color sampling rate and/or bit depth for pictures in a sequence (900)

slice-adaptive color space, color sampling rate and/or bit depth for picture (1000) in a sequence block-adaptive color space, color sampling rate and/or bit depth for slice (1100) of a picture in a sequence

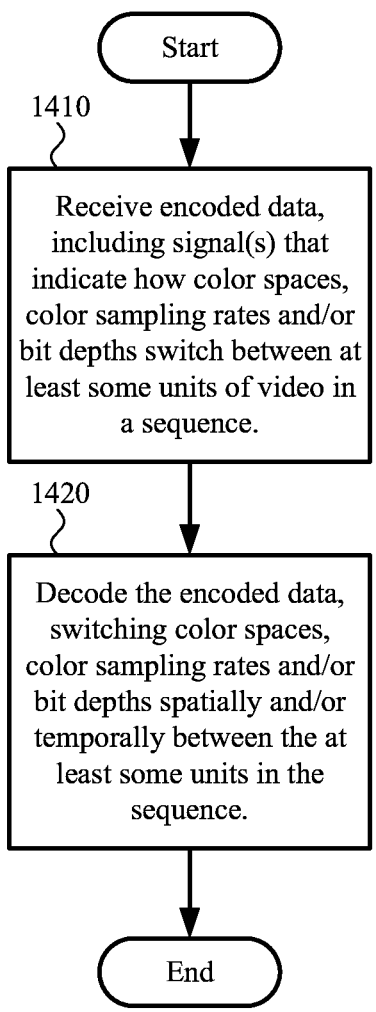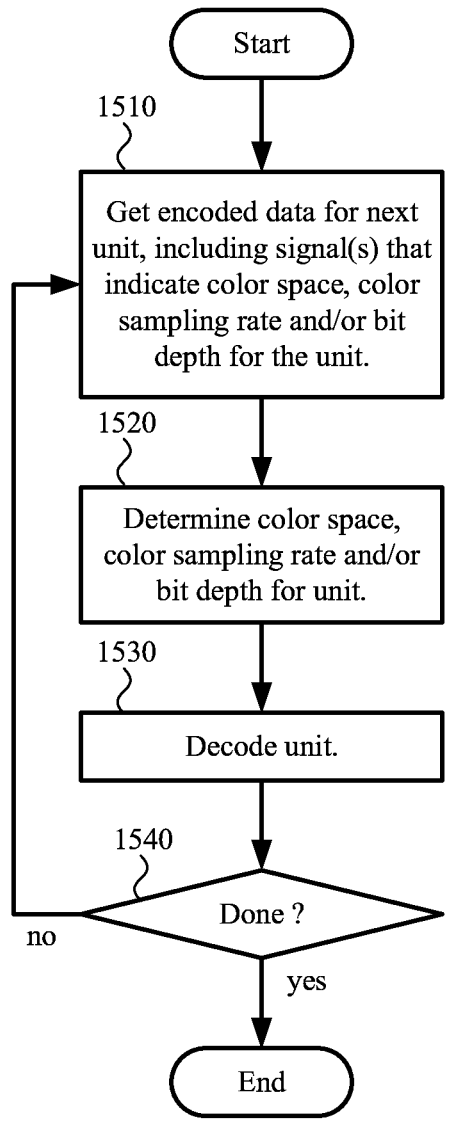

ENCODING/DECODING WITH FLAGS TO INDICATE SWITCHING OF COLOR SPACES, COLOR SAMPLING RATES AND/OR BIT DEPTHS

CROSS REFERENCE TO RELATED APPLICATIONS

This application is a continuation of U.S. patent application Ser. No. 16/126,325, filed Sep. 10, 2018, which is a continuation of U.S. patent application Ser. No. 15/029,242, filed Apr. 13, 2016, now U.S. Pat. No. 10,171,833, which is the U.S. National Stage of International Application No. PCT/CN2014/072847, filed Mar. 4, 2014, which was published in English under PCT Article 21(2), and which is incorporated by reference herein in its entirety.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the H.265/HEVC standard (ITU-T H.265 or ISO/IEC 23008-2) has been approved. Extensions to the H.265/HEVC standard (e.g., for scalable video coding/decoding, for coding/decoding of video with higher fidelity in terms of sample bit depth or chroma sampling rate, for screen capture content, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

A video source such as a camera, animation output, screen capture module, etc. typically provides video in a particular color space, with color components of the video subsampled according to a particular color sampling rate, and with sample values having a particular bit depth. In general, a color space (sometimes called a color model) is a model for representing colors as n values per physical position, for n≥1, where each of the n values provides a color component value for that position. For example, in a YUV color space, a luma (or Y) component value represents an approximate brightness at a position and multiple chroma (or U and V) component values represent color differences at the position. Or, in an RGB color space, a red (R) component value represents a red intensity, a green (G) component value represents a green intensity, and a blue (B) component value represents a blue intensity at a position. Historically, different color spaces have advantages for different applications such as display, printing, broadcasting and encoding/decoding. Sample values can be converted between color spaces using color space transformation operations.

Color sampling rate (sometimes called chroma sampling rate) refers to the relative spatial resolution between color components. For example, for a color sampling rate of 4:4:4, information for secondary components (e.g., U and V components for YUV) has the same spatial resolution as information for a primary component (e.g., Y component for YUV). For a color sampling rate of 4:2:2 or 4:2:0, information for secondary components is downsampled relative to information for the primary component. YUV 4:2:0 format is commonly used for encoding/decoding. As a design principle, the decision to use a YUV 4:2:0 format for encoding/decoding is premised on the understanding that, for most use cases, viewers do not notice many visual differences between video encoded/decoded in a YUV 4:2:0 format and video encoded/decoded in a YUV 4:4:4 format. The compression advantages for the YUV 4:2:0 format, which has fewer samples per frame, are therefore compelling.

Bit depth refers to the number of bits per sample value. Common bit depths are 8 bits per sample, 10 bits per sample and 12 bits per sample. In general, having more bits per sample allows for more precise gradations of colors for video, but uses more storage for the video. Having fewer bits per sample typically reduces bit rate at the cost of reduced quality.

Many commercially available video encoders and decoders support only a YUV 4:2:0 format. Other commercially available encoders and decoders (e.g., for the H.264/AVC standard or H.265/HEVC standard) allow an encoder to specify a color space, color sampling rate and bit depth for a given sequence. The specified color space, color sampling rate and bit depth are used for the entire video sequence. These approaches do not provide sufficient flexibility for a general-purpose codec system that may process very different kinds of video content within a single video sequence.

SUMMARY

In summary, the detailed description presents innovations in the area of adaptive encoding and decoding. For example, some of the innovations relate to an encoder that switches color spaces between units within a video sequence during encoding, as well as a corresponding decoder. Other innovations relate to an encoder that switches color sampling rates between units within a video sequence during encoding, as well as a corresponding decoder. Still other innovations relate to an encoder that switches bit depths between units within a video sequence during encoding, as well as a corresponding decoder. These innovations can improve coding efficiency in many scenarios.

According to a first aspect of the innovations described herein, an image or video encoder encodes video in a sequence. As part of the encoding, the encoder switches color spaces, color sampling rates and/or bit depths spatially and/or temporally between at least some units (e.g., pictures of the sequence, slices of a given picture of the sequence, blocks of a given picture of the sequence) of the video within the sequence. The encoder outputs encoded data in a bitstream. The encoded data includes one or more signals indicating how the color spaces, the color sampling rates and/or the bit depths switch between the at least some units of the video within the sequence.

A corresponding decoder receives encoded data in a bitstream. The encoded data includes one or more signals indicating how color spaces, color sampling rates and/or bit depths switch between at least some units (e.g., pictures of the sequence, slices of a given picture of the sequence, blocks of a given picture of the sequence) of video within a sequence. The decoder decodes the encoded data. As part of the decoding, the decoder switches the color spaces, the color sampling rates and/or the bit depths spatially and/or temporally between the at least some units of the video within the sequence.

For example, during encoding or decoding, the switching includes changing between two of the color spaces using color space transformation operations. For color space transformation operations, the color spaces can include at least one YUV-type color space and at least one RGB-type color space.

Or, as another example, during encoding or decoding, the switching includes changing between two of the color spaces using color space reordering operations. For color space reordering operations, the color spaces can include multiple RGB-type color spaces.

Or, as another example, during encoding or decoding, the switching includes changing between two of the color sampling rates. The color sampling rates can include two or more of 4:4:4, 4:2:2, 4:2:0 and 4:0:0.

Or, as another example, during encoding or decoding, the switching includes changing between two of the bit depths. The bit depths can include two or more of 12 bits per sample, 10 bits per sample and 8 bits per sample. Also, different color components of a given unit of the video can have different bit depths.

Syntax and semantics for the signal(s) that indicate how color spaces, color sampling rates and/or bit depths switch depend on implementation. For example, the signal(s) include a flag value for a given unit of the video. The flag value indicates a selection between two options for the color spaces, the color sampling rates or the bit depths. Or, the signal(s) include a syntax element for a given unit of the video. The syntax element indicates a selection between three or more options for the color spaces, the color sampling rates or the bit depths. A signal can be predictively coded, in which case a delta value for a parameter for a given unit of the video represents a difference between an actual value of the parameter and its predictor. The predictor can be a sequence layer parameter. Or, the predictor can be based on one or more actual values of the parameter for one or more previous units of the video.

In addition to the signal(s), the encoded data can include information identifying or defining the color spaces, color sampling rates and/or bit depths. For example, the information can include a matrix of values usable for color space transformation operations between two of the color spaces.

The encoding or decoding can include prediction of sample values of a current block in a current picture based at least in part on a set of sample values of previously reconstructed content. For intra-picture prediction, the set of sample values of the previously reconstructed content is part of the current picture. For inter-picture prediction, the set of sample values of the previously reconstructed content is part of a reference picture. As part of the prediction, the encoder or decoder can evaluate whether the set of sample values of the previously reconstructed content and the sample values of the current block are in different formats.

In some cases, the set of sample values of the previously reconstructed content are stored in a first format, and the sample values of the current block are encoded in a second format different than the first format. In this event, as part of the prediction, the encoder or decoder can (a) convert the set of sample values of the previously reconstructed content from the first format to the second format (e.g., converting between two color spaces, converting between two color sampling rates and/or converting between two bit depths), (b) predict the sample values of the current block using the set of converted sample values of the previously reconstructed content, and (c) reconstruct the sample values of the current block based at least in part on the predicted sample values of the current block. Or, as part of the prediction, the encoder or decoder can (a) predict the sample values of the current block using the set of sample values of the previously reconstructed content, (b) convert the predicted sample values of the current block from the first format to the second format, and (c) reconstruct the sample values of the current block based at least in part on the converted predicted sample values of the current block. After the prediction, the encoder or decoder can (d) convert the reconstructed sample values of the current block from the second format to the first format, and (e) store the converted reconstructed sample values of the current block (in the first format) as part of the previously reconstructed content.

The encoding or decoding can also include deblocking previously reconstructed content according to one or more rules. For example, as part of the deblocking, the encoder or decoder adjusts strength of a deblocking filter depending on whether primary components of two adjacent blocks have non-zero residual values. Or, as part of the deblocking, the encoder or decoder adjusts strength of a deblocking filter depending on whether corresponding components of the two adjacent blocks have non-zero residual values. Thus, the rule(s) can account for different color spaces of the two adjacent blocks.

The innovations for adaptive switching of color spaces, color sampling rates and/or bit depths can be implemented as part of a method, as part of a computing device adapted to perform the method or as part of a tangible computer-readable media storing computer-executable instructions for causing a computing device to perform the method. The various innovations can be used in combination or separately. In particular, a video encoder and decoder can adaptively switch only color spaces within a video sequence (with a fixed color sampling rate and fixed bit depth). Or, a video encoder and decoder can adaptively switch only color sampling rates within a video sequence (with a fixed color space and fixed bit depth). Or, a video encoder and decoder can adaptively switch only bit depths within a video sequence (with a fixed color space and fixed color sampling rate). Or, a video encoder and decoder can adaptively switch (1) color spaces and color sampling rates, but not bit depths, within a video sequence, (2) color spaces and bit depths, but not color sampling rates, within a video sequence, or (3) color sampling rates and bit depths, but not color spaces, within a video sequence. Or, a video encoder and decoder can adaptively switch color spaces, color sampling rates, and bit depths within a video sequence.

The foregoing and other objects, features, and advantages of the invention will become more apparent from the following detailed description, which proceeds with reference to the accompanying figures.

BRIEF DESCRIPTION OF THE DRAWINGS

FIG. 3 is a diagram of an example encoder system in conjunction with which some described embodiments can be implemented.

FIG. 4 is a diagram of an example decoder system in conjunction with which some described embodiments can be implemented.

FIG. 14 is a flowchart illustrating a generalized technique for adaptively switching color spaces, color sampling rates and/or bit depths during decoding, and FIG. 15 is a flowchart illustrating a more detailed example technique for adaptively switching on a unit-by-unit basis during decoding.

DETAILED DESCRIPTION

Figure 1:
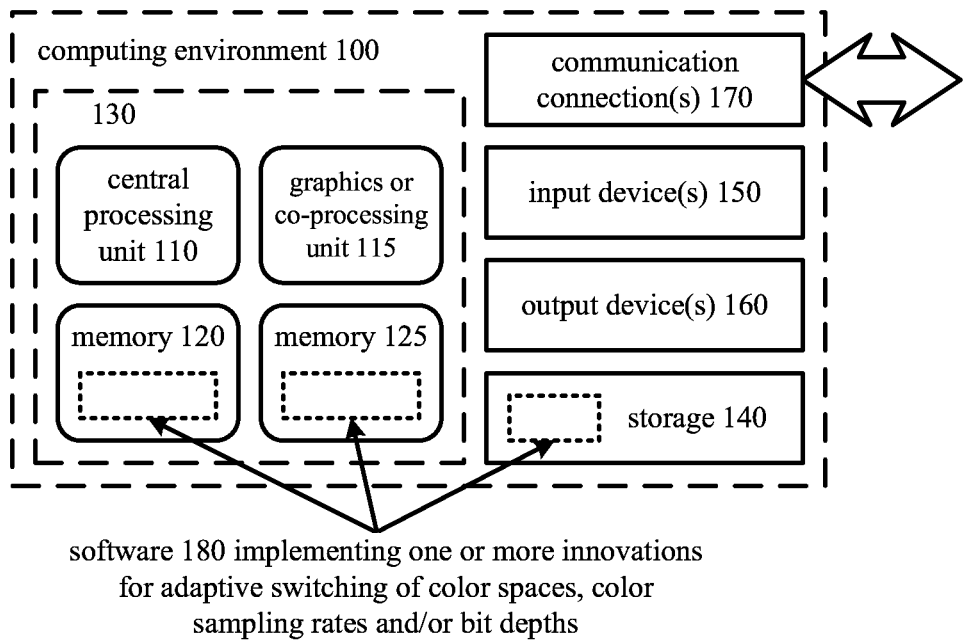
FIG. 1 is a diagram of an example computing system in which some described embodiments can be implemented.

The detailed description presents innovations in the areas of adaptive encoding and decoding. For example, some of the innovations relate to an encoder that switches color spaces between units within a video sequence during encoding, as well as a corresponding decoder. Other innovations relate to an encoder that switches color sampling rates between units within a video sequence during encoding, as well as a corresponding decoder. Still other innovations relate to an encoder that switches bit depths between units within a video sequence during encoding, as well as a corresponding decoder. These innovations can improve coding efficiency in many scenarios.

In general, a color space (sometimes called a color model) is a model for representing colors as n values per physical position, for n≥1, where each of the n values provides a color component value for that position.

For example, in a YUV color space, a luma (or Y) component value represents an approximate brightness at a position and multiple chroma (or U and V) component values represent color differences at the position. The precise definitions of the color difference values (and conversion operations to/from a YUV color space to another color space such as RGB) depend on implementation. Typically, for purposes of encoding and decoding, the Y component is the primary component, and the U and V components are secondary components. In general, as used herein, the term YUV-type color space indicates any color space with a luma (or luminance) component and one or more chroma (or chrominance) components, including Y'UV, YIQ, Y'IQ, YDbDr as well as variations such as YCbCr and YCoCg.

The component signal measures that are used may be adjusted through the application of a non-linear transfer characteristics function (generally known as "gamma precompensation" and often denoted by the use of a prime symbol, although the prime symbol is often omitted for typographical convenience). Or, the component signal measures may be in a domain that has a linear relationship with light amplitude. The luma and chroma component signals may be well aligned with the perception of brightness and color for the human visual system, or the luma and chroma component signals may somewhat deviate from such measures (e.g., as in the YCoCg variation, in which formulas are applied that simplify the computation of the color component values).

As another example, in an RGB color space, a red (R) component value represents a red intensity, a green (G) component value represents a green intensity, and a blue (B) component value represents a blue intensity at a position. As used herein, the term RGB-type color space indicates a color space with R, G and B color components in any order. Examples include RGB, BGR and GBR color spaces, which differ in terms of the primary component for purposes of encoding and decoding. The primary component is indicated with the first letter of the color space (e.g., R for RGB).

Color sampling rate (sometimes called chroma sampling rate) refers to the relative spatial resolution between color components. For example, for a color sampling rate of 4:4:4, information for secondary components (e.g., U and V components for YUV) has the same spatial resolution as information for a primary component (e.g., Y component for YUV). For a color sampling rate of 4:2:2 or 4:2:0, information for secondary components is downsampled relative to information for the primary component. A YUV 4:2:0 format is a format that sub-samples chroma information compared to a YUV 4:4:4 format, so that chroma resolution is half that of luma resolution both horizontally and vertically. A YUV 4:2:2 format is a format that sub-samples chroma information horizontally compared to a YUV 4:4:4 format, so that chroma resolution is half that of luma resolution horizontally. Other examples of color sampling rates are 4:1:1 (secondary components have quarter resolution horizontally) and 4:0:0 (secondary components dropped). Color sub-sampling is typically applied to YUV-type color spaces. RGB-type color spaces usually have a color sampling rate of 4:4:4, but can have a different color sampling rate according to which secondary color components are sub-sampled.

Although YUV 4:2:0 format is conventionally used for video encoding and decoding, there are some use cases for which video has richer color information, and higher color fidelity may be justified. In such use cases, the differences between YUV 4:4:4 and YUV 4:2:0 chroma sampling formats are more easily perceived by viewers. For example, for encoding/decoding of computer screen text content, animated video content with artificial hard-edged boundaries, or certain features of video content more generally (such as scrolling titles and hard-edged graphics, or video with information concentrated in chroma channels), a 4:4:4 format may be preferable to a 4:2:0 format.

Bit depth refers to the number of bits per sample value. Common bit depths are 8 bits per sample, 10 bits per sample and 12 bits per sample. Other possible bit depths include 4-bits per sample and 16 bits per sample.

Although operations described herein are in places described as being performed by a video encoder or decoder, in many cases the operations can be performed by another type of media processing tool (e.g., image encoder or decoder). For example, the operations can be performed for applications such as still-image coding/decoding, medical scan content coding/decoding, multispectral imagery content coding/decoding, etc.

Some of the innovations described herein are illustrated with reference to syntax elements and operations specific to the H.265/HEVC standard. For example, reference is made to the draft version JCTVC-P1005 of the H.265/HEVC standard—"High Efficiency Video Coding (HEVC) Range Extensions Text Specification: Draft 6," JCTVC-P1005_v1, February 2014. The innovations described herein can also be implemented for other standards or formats.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for adaptive switching of color spaces, color sampling rates and/or bit depths, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for adaptive switching of color spaces, color sampling rates and/or bit depths.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, screen capture module, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC (such as an ASIC digital signal processor ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments.

Figure 2A:
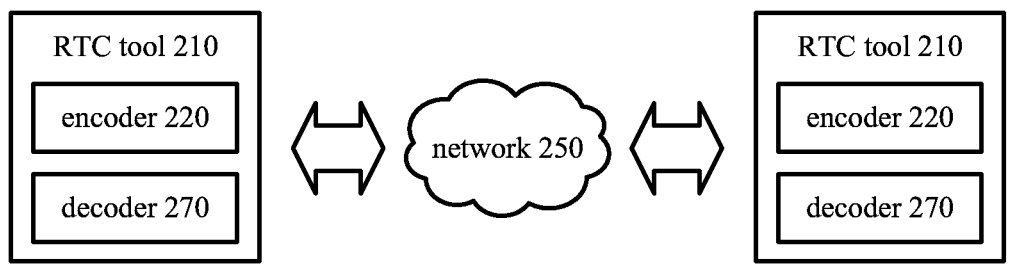
FIGS. 2a and 2b are diagrams of example network environments in which some described embodiments can be implemented.
Figure 2B:
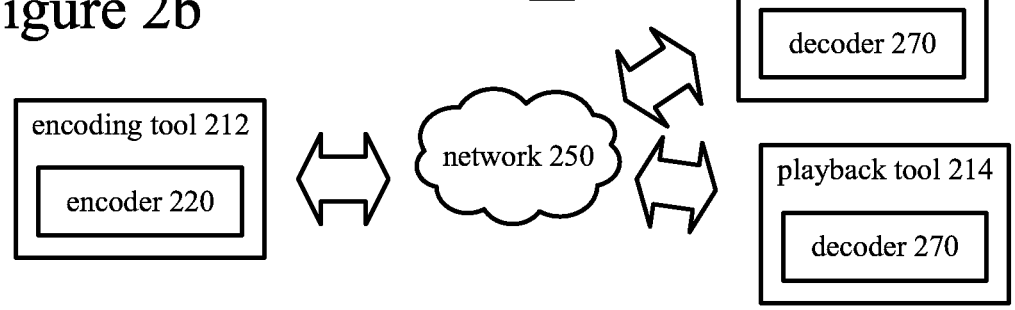

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the H.265/HEVC standard, SMPTE 421M standard, ISO-IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party or multi-part communication scenario. Although the network environment (201) in FIG. 2a includes two real-time communication tools (210), the network environment (201) can instead include three or more real-time communication tools (210) that participate in multi-party communication.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, screen capture module, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems.

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The encoder system (300) can be adapted for encoding of a particular type of content (e.g., screen capture content), or it can be adapted for encoding of any of several different types of content (e.g., screen capture content and natural video). The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include content encoded with adaptive switching of color spaces, color sampling rates and/or bit depths.

The video source (310) can be a camera, tuner card, storage media, screen capture module, or other digital video source. The video source (310) produces a sequence of video frames at a frame rate of, for example, 30 frames per second. As used herein, the term "frame" generally refers to source, coded or reconstructed image data. For progressive-scan video, a frame is a progressive-scan video frame. For interlaced video, in example embodiments, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) selects an individual source frame from the source frame storage area (320). The order in which frames are selected by the frame selector (330) for input to the encoder (340) may differ from the order in which the frames are produced by the video source (310), e.g., the encoding of some frames may be delayed in order, so as to allow some later frames to be encoded first and to thus facilitate temporally backward prediction. Before the encoder (340), the encoder system (300) can include a pre-processor (not shown) that performs pre-processing (e.g., filtering) of the selected frame (331) before encoding.

The encoder (340) encodes the selected frame (331) to produce a coded frame (341) and also produces memory management control operation ("MMCO") signals (342) or reference picture set ("RPS") information. The RPS is the set of frames that may be used for reference in motion compensation for a current frame or any subsequent frame. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). The MMCO/RPS information (342) indicates to a decoder which reconstructed frames may be used as reference frames, and hence should be stored in a frame storage area.

The encoder (340) accepts video in a particular color space (e.g., a YUV-type color space, an RGB-type color space), with a particular color sampling rate (e.g., 4:4:4) and a particular number of bits per sample (e.g., 12 bits per sample). During encoding, for different pictures, slices, blocks or other units of video, the encoder (340) can perform color space conversions to transform between a YUV-type color space and an RGB-type color space, or to/from some other color space. The encoder (340) can also perform color space conversions to reorder color components, changing which color component is the primary component (e.g., converting between RGB, BGR and GBR formats). During encoding, the encoder (340) can also perform resampling processing to change color sampling rates (e.g., between 4:4:4, 4:2:2 and 4:2:0 formats) for different pictures, slices, blocks or other units of video. The encoder (340) can also change bit depths (e.g., between 12 bits per sample, 10 bits per sample and 8 bits per sample) during encoding for different pictures, slices, blocks or other units of video. In some example implementations, the encoder (340) can switch color spaces, color sampling rates and/or bit depths on a picture-by-picture basis during encoding.

Generally, the encoder (340) includes multiple encoding modules that perform encoding tasks such as partitioning into tiles, adaptation of color space, color sampling rate and/or bit depth, intra prediction estimation and prediction, motion estimation and compensation, frequency transforms, quantization and entropy coding. The exact operations performed by the encoder (340) can vary depending on compression format. The format of the output encoded data can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

The encoder (340) can partition a frame into multiple tiles of the same size or different sizes. For example, the encoder (340) splits the frame along tile rows and tile columns that, with frame boundaries, define horizontal and vertical boundaries of tiles within the frame, where each tile is a rectangular region. Tiles are often used to provide options for parallel processing. A frame can also be organized as one or more slices, where a slice can be an entire frame or region of the frame. A slice can be decoded independently of other slices in a frame, which improves error resilience. The content of a slice or tile is further partitioned into blocks or other sets of sample values for purposes of encoding and decoding. In some example implementations, the encoder (340) can switch color spaces, color sampling rates and/or bit depths on a slice-by-slice basis during encoding.

For syntax according to the H.265/HEVC standard, the encoder splits the content of a frame (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder, and can be, for example, 64×64, 32×32 or 16×16 sample values. A CTU includes one or more coding units. A coding unit ("CU") has a luma coding block ("CB") and two corresponding chroma CBs.

For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. For an intra-predicted CU, the PU has the same size as the CU, unless the CU has the smallest size (e.g., 8×8). In that case, the CU can be split into four smaller PUs (e.g., each 4×4 if the smallest CU size is 8×8) or the PU can have the smallest CU size, as indicated by a syntax element for the CU. A CU also has one or more transform units for purposes of residual coding/decoding, where a transform unit ("TU") has a transform block ("TB") and two chroma TBs. A PU in an intra-predicted CU may contain a single TU (equal in size to the PU) or multiple TUs. The encoder decides how to partition video into CTUs, CUs, PUs, TUs, etc.

In H.265/HEVC implementations, a slice can include a single slice segment (independent slice segment) or be divided into multiple slice segments (independent slice segment and one or more dependent slice segments). A slice segment is an integer number of CTUs ordered consecutively in a tile scan, contained in a single network abstraction layer ("NAL") unit. For an independent slice segment, a slice segment header includes values of syntax elements that apply for the independent slice segment. For a dependent slice segment, a truncated slice segment header includes a few values of syntax elements that apply for that dependent slice segment, and the values of the other syntax elements for the dependent slice segment are inferred from the values for the preceding independent slice segment in decoding order.

As used herein, the term "block" can indicate a macroblock, prediction unit, residual data unit, or a CB, PB or TB, or some other set of sample values, depending on context. In some example implementations, the encoder (340) can switch color spaces, color sampling rates and/or bit depths on a block-by-block basis during encoding.

Returning to FIG. 3, the encoder represents an intra-coded block of a source frame (331) in terms of prediction from other, previously reconstructed sample values in the frame (331). For intra block copy ("BC") prediction, an intra-picture estimator estimates displacement of a block with respect to the other, previously reconstructed sample values. An intra-frame prediction reference region is a region of sample values in the frame that are used to generate BC-prediction values for the block. The intra-frame prediction region can be indicated with a block vector ("BV") value (determined in BV estimation). For intra spatial prediction for a block, the intra-picture estimator estimates extrapolation of the neighboring reconstructed sample values into the block. The intra-picture estimator can output prediction information (such as BV values for intra BC prediction, or prediction mode (direction) for intra spatial prediction), which is entropy coded. An intra-frame prediction predictor applies the prediction information to determine intra prediction values.

The encoder (340) represents an inter-frame coded, predicted block of a source frame (331) in terms of prediction from reference frames. A motion estimator estimates the motion of the block with respect to one or more reference frames (369). When multiple reference frames are used, the multiple reference frames can be from different temporal directions or the same temporal direction. A motion-compensated prediction reference region is a region of sample values in the reference frame(s) that are used to generate motion-compensated prediction values for a block of sample values of a current frame. The motion estimator outputs motion information such as motion vector ("MV") information, which is entropy coded. A motion compensator applies MVs to reference frames (369) to determine motion-compensated prediction values for inter-frame prediction.

The encoder can determine the differences (if any) between a block's prediction values (intra or inter) and corresponding original values. These prediction residual values are further encoded using a frequency transform, quantization and entropy encoding. For example, the encoder (340) sets values for quantization parameter ("QP") for a picture, tile, slice and/or other portion of video, and quantizes transform coefficients accordingly. The entropy coder of the encoder (340) compresses quantized transform coefficient values as well as certain side information (e.g., MV information, index values for BV predictors, BV differentials, QP values, mode decisions, parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique.

An adaptive deblocking filter is included within the motion compensation loop in the encoder (340) to smooth discontinuities across block boundary rows and/or columns in a decoded frame. Other filtering (such as de-ringing filtering, adaptive loop filtering ("ALF"), or sample-adaptive offset ("SAO") filtering; not shown) can alternatively or additionally be applied as in-loop filtering operations.

The encoded data produced by the encoder (340) includes syntax elements for various layers of bitstream syntax. For syntax according to the H.265/HEVC standard, for example, a picture parameter set ("PPS") is a syntax structure that contains syntax elements that may be associated with a picture. In some example implementations, a PPS can include one or more signals indicating a color space, color sampling rate and/or bit depth that apply for a picture (or multiple pictures that use the PPS), as well as other information identifying or defining available color spaces, available color sampling rates and/or available bit depths. A PPS can be used for a single picture, or a PPS can be reused for multiple pictures in a sequence. A PPS is typically signaled separate from encoded data for a picture (e.g., one NAL unit for a PPS, and one or more other NAL units for encoded data for a picture). Within the encoded data for a picture, a syntax element indicates which PPS to use for the picture. Similarly, for syntax according to the H.265/HEVC standard, a sequence parameter set ("SPS") is a syntax structure that contains syntax elements that may be associated with a sequence of pictures. A bitstream can include a single SPS or multiple SPSs. A SPS is typically signaled separate from other data for the sequence, and a syntax element in the other data indicates which SPS to use. In some example implementations, an SPS for a sequence can include information identifying or defining available color spaces, available color sampling rates and/or available bit depths, which is referenced when switching color spaces, color sampling rates and/or bit depths within the sequence.

For slice layer, a slice header (e.g., slice segment header) includes values of syntax elements that apply for a slice (e.g., an independent slice segment and any dependent slice segments that follow). In some example implementations, a slice header can include one or more signals indicating a color space, color sampling rate and/or bit depth that apply for a slice. In some example implementations, a slice header can also include information identifying or defining available color spaces, available color sampling rates and/or available bit depths, which is referenced when switching color spaces, color sampling rates and/or bit depths within the slice. For block layer (e.g., for a CTU), a syntax structure includes values of syntax elements that apply for a block. In some example implementations, the syntax structure for a block can include one or more signals indicating a color space, color sampling rate and/or bit depth that apply for the block.

The coded frames (341) and MMCO/RPS information (342) (or information equivalent to the MMCO/RPS information (342), since the dependencies and ordering structures for frames are already known at the encoder (340)) are processed by a decoding process emulator (350). The decoding process emulator (350) implements some of the functionality of a decoder, for example, decoding tasks to reconstruct reference frames. In a manner consistent with the MMCO/RPS information (342), the decoding processes emulator (350) determines whether a given coded frame (341) needs to be reconstructed and stored for use as a reference frame in inter-frame prediction of subsequent frames to be encoded. If a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36n). In a manner consistent with the MMCO/RPS information (342), the decoding process emulator (350) manages the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

IV. Example Decoder Systems.

FIG. 4 is a block diagram of an example decoder system (400) in conjunction with which some described embodiments may be implemented. The decoder system (400) can be a general-purpose decoding tool capable of operating in any of multiple decoding modes such as a low-latency decoding mode for real-time communication and a higher-latency decoding mode for media playback from a file or stream, or it can be a special-purpose decoding tool adapted for one such decoding mode. The decoder system (400) can be adapted for decoding of a particular type of content (e.g., screen capture content), or it can be adapted for decoding of any of several different types of content (e.g., screen capture content and natural video). The decoder system (400) can be implemented as an operating system module, as part of an application library or as a standalone application. Overall, the decoder system (400) receives coded data from a channel (410) and produces reconstructed frames as output for an output destination (490). The coded data can include content encoded with adaptive switching of color spaces, color sampling rates and/or bit depths.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes and/or demultiplexes data that has been aggregated for transmission or storage as a media stream (e.g., according to a media program stream or transport stream format such as ITU-T H.222.0|ISO/IEC 13818-1 or an internet real-time transport protocol format such as IETF RFC 3550), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s). The channel (410) or channel decoder (420) may also include other elements (not shown), e.g., for FEC decoding and analog signal demodulation.

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) contain, as part of the syntax of an elementary coded video bitstream, coded data for one or more pictures. The coded data (421) in the coded data area (430) can also include media metadata relating to the encoded video data (e.g., as one or more parameters in one or more SEI messages or VUI messages).

In general, the coded data area (430) temporarily stores coded data (421) until such coded data (421) is used by the decoder (450). At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460).

During decoding, for different pictures, slices, blocks or other units of video, the decoder (450) can perform color space conversions to transform between a YUV-type color space and an RGB-type color space, or to/from some other color space. The decoder (450) can also perform color space conversions to reorder color components for different pictures, slices, blocks or other units of video, changing which color component is the primary component (e.g., converting between RGB, BGR and GBR formats). During decoding, the decoder (450) can also perform resampling processing to change color sampling rates and/or change bit depths for different pictures, slices, blocks or other units of video. In some example implementations, the decoder (450) can switch color spaces, color sampling rates and/or bit depths on a picture-by-picture basis during decoding. Alternatively, the decoder (450) can switch color spaces, color sampling rates and/or bit depths on a slice-by-slice basis or block-by-block basis during decoding.

Generally, the decoder (450) includes multiple decoding modules that perform decoding tasks such as entropy decoding, adaptation of color space, color sampling rate and/or bit depth, intra-frame prediction, motion-compensated inter-frame prediction, inverse quantization, inverse frequency transforms, and merging of tiles. The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and, at an appropriate time, makes the received encoded data available to an entropy decoder. The entropy decoder entropy decodes entropy-coded quantized data as well as entropy-coded side information, typically applying the inverse of entropy encoding performed in the encoder. A motion compensator applies motion information to one or more reference frames to form motion-compensated prediction values for any inter-coded blocks of the frame being reconstructed. An intra-frame prediction module can spatially predict sample values of a current block from neighboring, previously reconstructed sample values or, for intra BC prediction, predict sample values of a current block using previously reconstructed sample values of an intra-frame prediction reference region in the frame. The reference region can be indicated with a BV value. The decoder (450) also reconstructs prediction residual values. An inverse quantizer inverse quantizes entropy-decoded data. For example, the decoder (450) sets values for QP for a picture, tile, slice and/or other portion of video based on syntax elements in the bitstream, and inverse quantizes transform coefficients accordingly. An inverse frequency transformer converts the quantized, frequency-domain data into spatial-domain data. For an inter-frame predicted block, the decoder (450) combines reconstructed prediction residual values with motion-compensated prediction values. The decoder (450) can similarly combine prediction residual values with prediction values from intra prediction. An adaptive deblocking filter is included within the motion compensation loop in the video decoder (450) to smooth discontinuities across block boundary rows and/or columns in the decoded frame (451). Other filtering (such as de-ringing filtering, ALF, or SAO filtering; not shown) can alternatively or additionally be applied as in-loop filtering operations.

The decoded frame temporary memory storage area (460) includes multiple frame buffer storage areas (461, 462, . . . , 46n). The decoded frame storage area (460) is an example of a decoded picture buffer. The decoder (450) uses the MMCO/RPS information (432) to identify a frame buffer (461, 462, etc.) in which it can store a decoded frame (451). The decoder (450) stores the decoded frame (451) in that frame buffer.

An output sequencer (480) identifies when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Example Video Encoders.

Figure 5A:
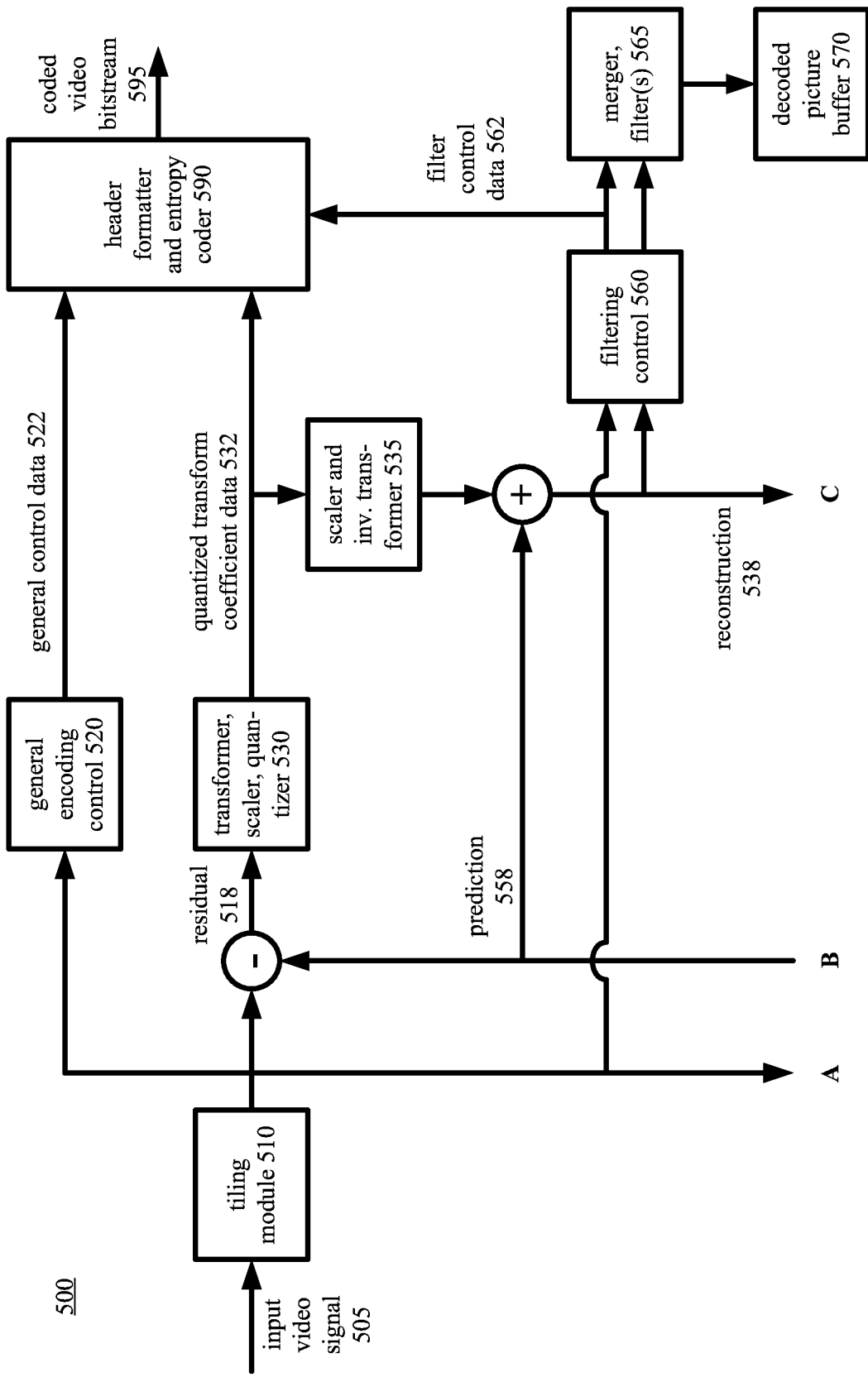
FIGS. 5a and 5b are diagrams illustrating an example video encoder in conjunction with which some described embodiments can be implemented.
Figure 5B:
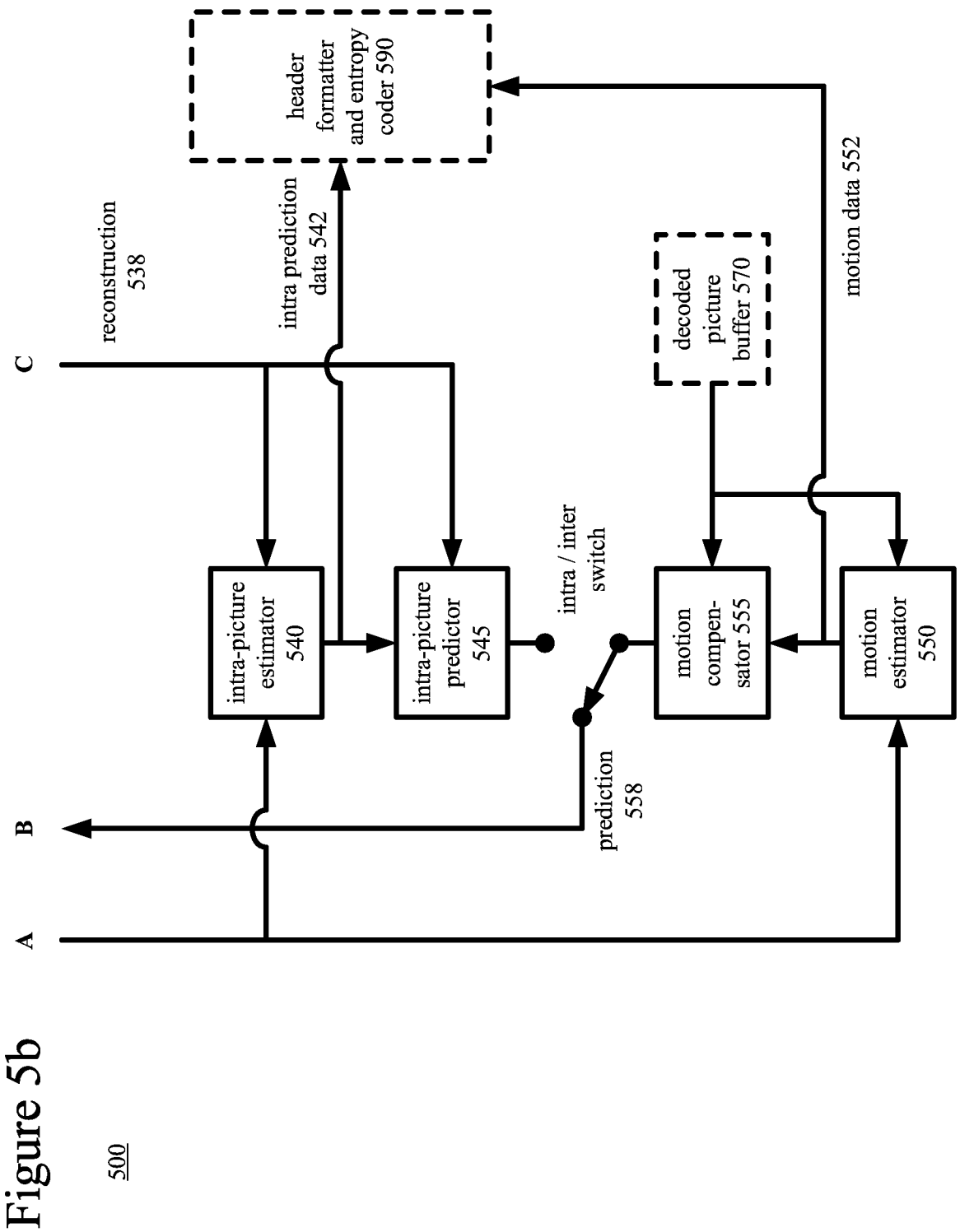

FIGS. 5a and 5b are a block diagram of a generalized video encoder (500) in conjunction with which some described embodiments may be implemented. The encoder (500) receives a sequence of video pictures including a current picture as an input video signal (505) and produces encoded data in a coded video bitstream (595) as output.

The encoder (500) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the H.265/HEVC standard, the encoder partitions a picture into CTUs (CTBs), CUs (CBs), PUs (PBs) and TU (TBs).

The encoder (500) compresses pictures using intra-picture coding and/or inter-picture coding. Many of the components of the encoder (500) are used for both intra-picture coding and inter-picture coding. The exact operations performed by those components can vary depending on the type of information being compressed.

A tiling module (510) optionally partitions a picture into multiple tiles of the same size or different sizes. For example, the tiling module (510) splits the picture along tile rows and tile columns that, with picture boundaries, define horizontal and vertical boundaries of tiles within the picture, where each tile is a rectangular region. In H.265/HEVC implementations, the encoder (500) partitions a picture into one or more slices, where each slice includes one or more slice segments.

The general encoding control (520) receives pictures for the input video signal (505) as well as feedback (not shown) from various modules of the encoder (500). Overall, the general encoding control (520) provides control signals (not shown) to other modules (such as the tiling module (510), transformer/scaler/quantizer (530), scaler/inverse transformer (535), intra-picture estimator (540), motion estimator (550) and intra/inter switch) to set and change coding parameters during encoding. In particular, the general encoding control (520) can decide how to adaptively switch color spaces, color sampling rates and/or bit depths during encoding on a picture-by-picture basis, slice-by-slice basis, block-by-block basis or some other basis. The general encoding control (520) can also evaluate intermediate results during encoding. The general encoding control (520) produces general control data (522) that indicates decisions made during encoding, so that a corresponding decoder can make consistent decisions. The general control data (522) is provided to the header formatter/entropy coder (590).

If the current picture is predicted using inter-picture prediction, a motion estimator (550) estimates the motion of blocks of sample values of the current picture of the input video signal (505) with respect to one or more reference pictures. The decoded picture buffer (570) buffers one or more reconstructed previously coded pictures for use as reference pictures. When multiple reference pictures are used, the multiple reference pictures can be from different temporal directions or the same temporal direction. The motion estimator (550) produces as side information motion data (552) such as MV data, merge mode index values, and reference picture selection data. The motion data (552) is provided to the header formatter/entropy coder (590) as well as the motion compensator (555).

The motion compensator (555) applies MVs to the reconstructed reference picture(s) from the decoded picture buffer (570). The motion compensator (555) produces motion-compensated predictions for the current picture. When the secondary components for a picture have the same resolution as the primary component (e.g. when the format is YUV 4:4:4 format or RGB 4:4:4 format), the MV value that is applied for a secondary component block may be the same as the MV value applied for the corresponding primary component block. On the other hand, when the secondary components for a picture have reduced resolution relative to the primary component (e.g. when the format is YUV 4:2:0 format), the MV value that is applied for a secondary component block may be scaled down and possibly rounded to adjust for the difference in resolution (e.g. by dividing the vertical and horizontal components of the MV value by two and truncating or rounding them to integer values).

In a separate path within the encoder (500), an intra-picture estimator (540) determines how to perform intra-picture prediction for blocks of sample values of a current picture of the input video signal (505). The current picture can be entirely or partially coded using intra-picture coding. Using values of a reconstruction (538) of the current picture, for intra spatial prediction, the intra-picture estimator (540) determines how to spatially predict sample values of a current block of the current picture from neighboring, previously reconstructed sample values of the current picture. Or, for intra BC prediction using BV values, the intra-picture estimator (540) estimates displacement of the sample values of the current block to different candidate reference regions within the current picture. In FIG. 5b, the candidate reference regions include reconstructed sample values. Alternatively, for purposes of BV estimation, the candidate reference regions can include input sample values.

The intra-picture estimator (540) produces as side information intra prediction data (542), such as information indicating whether intra prediction uses spatial prediction or intra BC prediction (e.g., a flag value per intra block), prediction mode direction (for intra spatial prediction), and BV values (for intra BC prediction). The intra prediction data (542) is provided to the header formatter/entropy coder (590) as well as the intra-picture predictor (545).

According to the intra prediction data (542), the intra-picture predictor (545) spatially predicts sample values of a current block of the current picture from neighboring, previously reconstructed sample values of the current picture. Or, for intra BC prediction, the intra-picture predictor (545) predicts the sample values of the current block using previously reconstructed sample values of an intra-picture prediction reference region, which is indicated by a BV value for the current block. In some cases, the BV value can be a BV predictor (predicted BV value). In other cases, the BV value can be different than its predicted BV value, in which case a BV differential indicates the difference between the predicted BV value and BV value. When the secondary components for a picture have the same resolution as the primary component (e.g. when the format is YUV 4:4:4 format or RGB 4:4:4 format), the BV value that is applied for a secondary component block may be the same as the BV value applied for the corresponding primary component block. On the other hand, when the secondary components for a picture have reduced resolution relative to the primary component (e.g. when the format is YUV 4:2:0 format), the BV value that is applied for a secondary component block may be scaled down and possibly rounded to adjust for the difference in resolution (e.g. by dividing the vertical and horizontal components of the BV value by two and truncating or rounding them to integer values).

The intra/inter switch selects whether the prediction (558) for a given block will be a motion-compensated prediction or intra-picture prediction. The difference (if any) between a block of the prediction (558) and a corresponding part of the original current picture of the input video signal (505) provides values of the residual (518), for a non-skip-mode block. During reconstruction of the current picture, for a non-skip-mode block, reconstructed residual values are combined with the prediction (558) to produce an approximate or exact reconstruction (538) of the original content from the video signal (505). (In lossy compression, some information is lost from the video signal (505).)

In the transformer/scaler/quantizer (530), a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (558) is null), producing blocks of frequency transform coefficients. The encoder (500) may also be able to indicate that such transform step is skipped. The scaler/quantizer scales and quantizes the transform coefficients. For example, the quantizer applies dead-zone scalar quantization to the frequency-domain data with a quantization step size that varies on a picture-by-picture basis, tile-by-tile basis, slice-by-slice basis, block-by-block basis, frequency-specific basis or other basis. The quantized transform coefficient data (532) is provided to the header formatter/entropy coder (590).

In the scaler/inverse transformer (535), a scaler/inverse quantizer performs inverse scaling and inverse quantization on the quantized transform coefficients. An inverse frequency transformer performs an inverse frequency transform, producing blocks of reconstructed prediction residual values or sample values. For a non-skip-mode block, the encoder (500) combines reconstructed residual values with values of the prediction (558) (e.g., motion-compensated prediction values, intra-picture prediction values) to form the reconstruction (538). For a skip-mode block, the encoder (500) uses the values of the prediction (558) as the reconstruction (538).

For intra-picture prediction, the values of the reconstruction (538) can be fed back to the intra-picture estimator (540) and intra-picture predictor (545). Also, the values of the reconstruction (538) can be used for motion-compensated prediction of subsequent pictures. The values of the reconstruction (538) can be further filtered. A filtering control (560) determines how to perform deblock filtering and SAO filtering on values of the reconstruction (538), for a given picture of the video signal (505). The filtering control (560) produces filter control data (562), which is provided to the header formatter/entropy coder (590) and merger/filter(s) (565).

In the merger/filter(s) (565), the encoder (500) merges content from different tiles into a reconstructed version of the picture. The encoder (500) selectively performs deblock filtering and SAO filtering according to the filter control data (562), so as to adaptively smooth discontinuities across boundaries in the pictures. Other filtering (such as de-ringing filtering or ALF; not shown) can alternatively or additionally be applied. Tile boundaries can be selectively filtered or not filtered at all, depending on settings of the encoder (500), and the encoder (500) may provide syntax within the coded bitstream to indicate whether or not such filtering was applied. The decoded picture buffer (570) buffers the reconstructed current picture for use in subsequent motion-compensated prediction.

The header formatter/entropy coder (590) formats and/or entropy codes the general control data (522), quantized transform coefficient data (532), intra prediction data (542), motion data (552) and filter control data (562). The general control data (522) includes signals indicating color spaces, color sampling rates and/or bit depths for pictures, slice, blocks, or other units of the video. Such signals can be included, for example, in a PPS, slice header, block syntax structure or other syntax structure, and can be entropy coded or signaled as fixed length values. The header formatter/entropy coder (590) can also format and/or entropy code information identifying or defining available color spaces (e.g., list of pre-defined color spaces, custom matrices for color space transformation operations), information identifying or defining available color sampling rates (e.g., list of pre-defined color sampling rates, other color sampling rates, or identification of operations for downsampling and upsampling) and/or information identifying or defining available bit depths (e.g., list of pre-defined bit depths, other bit depths, or identification of operations for bit depth conversion), which is usable by a decoder during adaptive switching.

The header formatter/entropy coder (590) provides the encoded data in the coded video bitstream (595). The format of the coded video bitstream (595) can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

Depending on implementation and the type of compression desired, modules of an encoder (500) can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

VI. Example Video Decoders.

Figure 6:
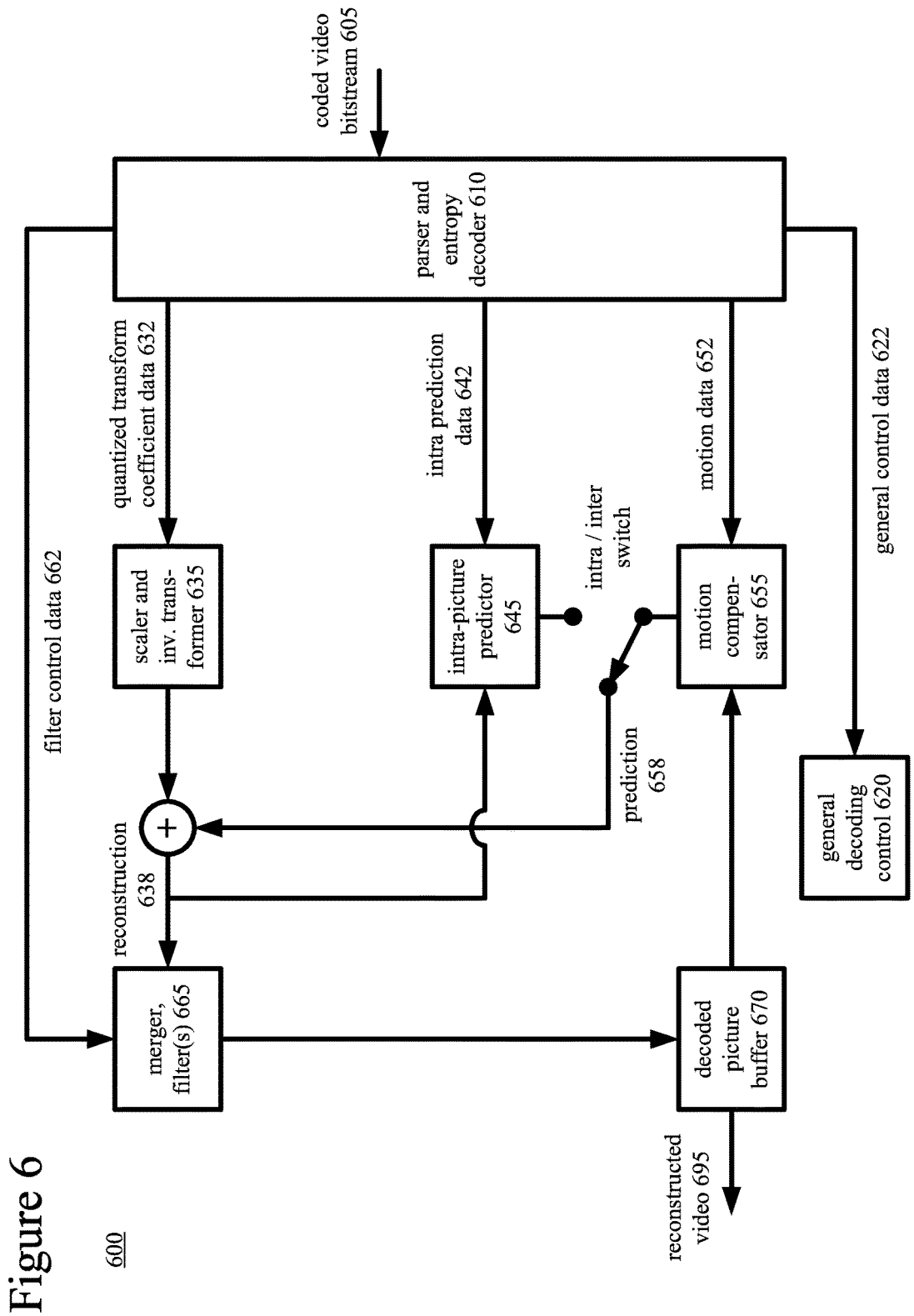
FIG. 6 is a diagram illustrating an example video decoder in conjunction with which some described embodiments can be implemented.

FIG. 6 is a block diagram of a generalized decoder (600) in conjunction with which some described embodiments may be implemented. The decoder (600) receives encoded data in a coded video bitstream (605) and produces output including pictures for reconstructed video (695). The format of the coded video bitstream (605) can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

The decoder (600) is block-based and uses a block format that depends on implementation. Blocks may be further sub-divided at different stages. For example, a picture can be divided into 64×64 blocks, 32×32 blocks or 16×16 blocks, which can in turn be divided into smaller blocks of sample values. In implementations of decoding for the H.265/HEVC standard, a picture is partitioned into CTUs (CTBs), CUs (CBs), PUs (PBs) and TU (TBs).

The decoder (600) decompresses pictures using intra-picture decoding and/or inter-picture decoding. Many of the components of the decoder (600) are used for both intra-picture decoding and inter-picture decoding. The exact operations performed by those components can vary depending on the type of information being decompressed.

A buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the encoder (500) (e.g., context-adaptive binary arithmetic decoding). As a result of parsing and entropy decoding, the parser/entropy decoder (610) produces general control data (622), quantized transform coefficient data (632), intra prediction data (642), motion data (652) and filter control data (662). The general control data (622) includes signals indicating color spaces, color sampling rates and/or bit depths for pictures, slice, blocks, or other units of video. Such signals can be included, for example, in a PPS, slice header, block syntax structure or other syntax structure, and can be entropy coded or signaled as fixed length values. The parser/entropy decoder (610) can also parse and/or entropy decode information identifying or defining available color spaces (e.g., list of pre-defined color spaces, custom matrices for color space transformation operations), information identifying or defining available color sampling rates (e.g., list of pre-defined color sampling rates, other color sampling rates, or identification of operations for downsampling and upsampling) and/or information identifying or defining available bit depths (e.g., list of pre-defined bit depths, other bit depths, or identification of operations for bit depth conversion), which is usable by the decoder (600) during adaptive switching.

The general decoding control (620) receives the general control data (622) and provides control signals (not shown) to other modules (such as the scaler/inverse transformer (635), intra-picture predictor (645), motion compensator (655) and intra/inter switch) to set and change decoding parameters during decoding. In particular, the general decoding control (620) can cause the decoder (600) to switch color spaces, color sampling rates and/or bit depths during decoding on a picture-by-picture basis, slice-by-slice basis, block-by-block basis or some other basis.

If the current picture is predicted using inter-picture prediction, a motion compensator (655) receives the motion data (652), such as MV data, reference picture selection data and merge mode index values. The motion compensator (655) applies MVs to the reconstructed reference picture(s) from the decoded picture buffer (670). The motion compensator (655) produces motion-compensated predictions for inter-coded blocks of the current picture. The decoded picture buffer (670) stores one or more previously reconstructed pictures for use as reference pictures.

In a separate path within the decoder (600), the intra-picture prediction predictor (645) receives the intra prediction data (642), such as information indicating whether intra prediction uses spatial prediction or intra BC prediction (e.g., a flag value per intra block), prediction mode direction (for intra spatial prediction), and BV values (for intra BC prediction). For intra spatial prediction, using values of a reconstruction (638) of the current picture, according to prediction mode data, the intra-picture predictor (645) spatially predicts sample values of a current block of the current picture from neighboring, previously reconstructed sample values of the current picture. Or, for intra BC prediction using BV values, the intra-picture predictor (645) predicts the sample values of the current block using previously reconstructed sample values of an intra-picture prediction reference region, which is indicated by a BV value for the current block.

The intra/inter switch selects whether the prediction (658) for a given block is a motion-compensated prediction or intra-picture prediction. For example, when H.265/HEVC syntax is followed, the intra/inter switch can be controlled based on a syntax element encoded for a CU of a picture that can contain intra-predicted CUs and inter-predicted CUs. For a non-skip-mode block, the decoder (600) combines the prediction (658) with reconstructed residual values to produce the reconstruction (638) of the content from the video signal. For a skip-mode block, the decoder (600) uses the values of the prediction (658) as the reconstruction (638).

To reconstruct the residual for a non-skip-mode block, the scaler/inverse transformer (635) receives and processes the quantized transform coefficient data (632). In the scaler/inverse transformer (635), a scaler/inverse quantizer performs inverse scaling and inverse quantization on the quantized transform coefficients. An inverse frequency transformer performs an inverse frequency transform, producing blocks of reconstructed prediction residual values or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform (e.g., an inverse discrete sine transform or an integer approximation thereof).

For intra-picture prediction, the values of the reconstruction (638) can be fed back to the intra-picture predictor (645). For inter-picture prediction, the values of the reconstruction (638) can be further filtered. In the merger/filter(s) (665), the decoder (600) merges content from different tiles into a reconstructed version of the picture. The decoder (600) selectively performs deblock filtering and SAO filtering according to the filter control data (662) and rules for filter adaptation, so as to adaptively smooth discontinuities across boundaries in the pictures. Other filtering (such as de-ringing filtering or ALF; not shown) can alternatively or additionally be applied. Tile boundaries can be selectively filtered or not filtered at all, depending on settings of the decoder (600) or a syntax indication within the encoded bitstream data. The decoded picture buffer (670) buffers the reconstructed current picture for use in subsequent motion-compensated prediction.

The decoder (600) can also include a post-processing filter. The post-processing filter (608) can include de-ringing filtering, adaptive Wiener filtering, film-grain reproduction filtering, SAO filtering or another kind of filtering.

Depending on implementation and the type of decompression desired, modules of a decoder (600) can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

VII. Adaptively Switching Color Spaces, Color Sampling Rates and/or Bit Depths.

During encoding, an encoder may treat a primary color component more carefully than secondary color components in various respects (e.g., more options for coding modes, potentially lower quantization step size). Also, by sub-sampling secondary color components, an encoder can allocate relatively more bits (and hence quality) to the primary color component.

The sample values of different pictures, slices or blocks of a video sequence may have different statistical characteristics. These different statistical characteristics can affect the efficiency of encoding, which can be measured in terms of rate-distortion performance (lower or higher quality for a given bit rate; or lower or higher bit rate for a given quality).

This section presents various features of adaptive encoding and decoding for units of a video sequence. A unit can be a picture, slice, block or other portion of the video sequence. For example, some of the features relate to encoding/decoding that includes adaptive switching of color spaces between units within a video sequence. Other features relate encoding/decoding that includes adaptive switching of color sampling rates between units within a video sequence. Still other features relate encoding/decoding that includes adaptive switching of bit depths between units within a video sequence. These features can improve coding efficiency in many scenarios, and can be used in combination or separately.

In particular, adaptive switching of color spaces, color sampling rates and/or bit depths can improve rate-distortion performance when encoding certain "artificially" created video content such as screen-capture content, or when encoding a mix of natural video and artificially-created video content. Common scenarios for encoding/decoding of screen-capture content include remote desktop conferencing and encoding/decoding of graphical overlays on natural video or other "mixed content" video.

A. Types of Video.

Figure 7:
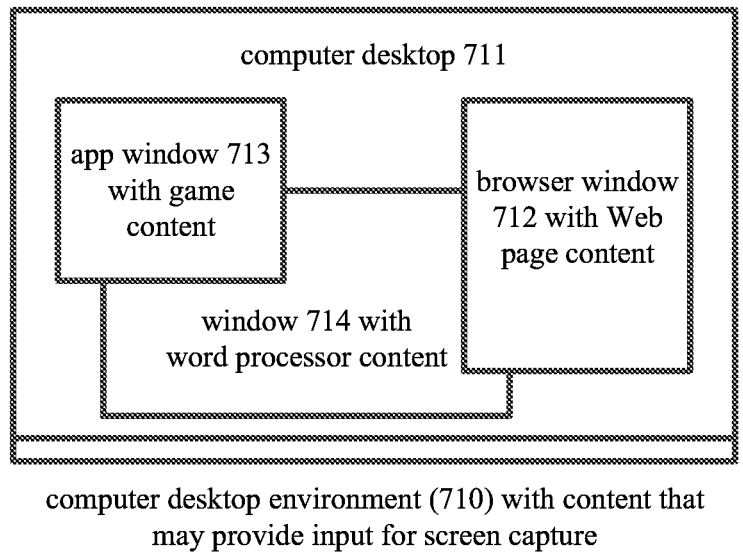
FIG. 7 is diagram illustrating a computer desktop environment with content that may provide input for screen capture.

In general, screen capture video represents the output of a computer screen or other display. FIG. 7 shows a computer desktop environment (710) with content that may provide input for screen capture. For example, screen capture video can represent a series of images of the entire computer desktop (711). Or, screen capture video can represent a series of images for one of the windows of the computer desktop environment, such as the app window (713) including game content, browser window (712) with Web page content or window (714) with word processor content.

As computer-generated, artificially-created video content, screen capture content tends to have relatively few discrete sample values, compared to natural video content that is captured using a video camera. For example, a region of screen capture content often includes a single uniform color, whereas a region in natural video content more likely includes colors that gradually vary. Also, screen capture content typically includes distinct structures (e.g., graphics, text characters) that are exactly repeated from frame-to-frame, even if the content may be spatially displaced (e.g., due to scrolling). Screen capture content is often encoded in a format (e.g., YUV 4:4:4 or RGB 4:4:4) with high chroma sampling resolution, although it may also be encoded in a format with lower chroma sampling resolution (e.g., YUV 4:2:0, YUV 4:2:2).

Figure 8:
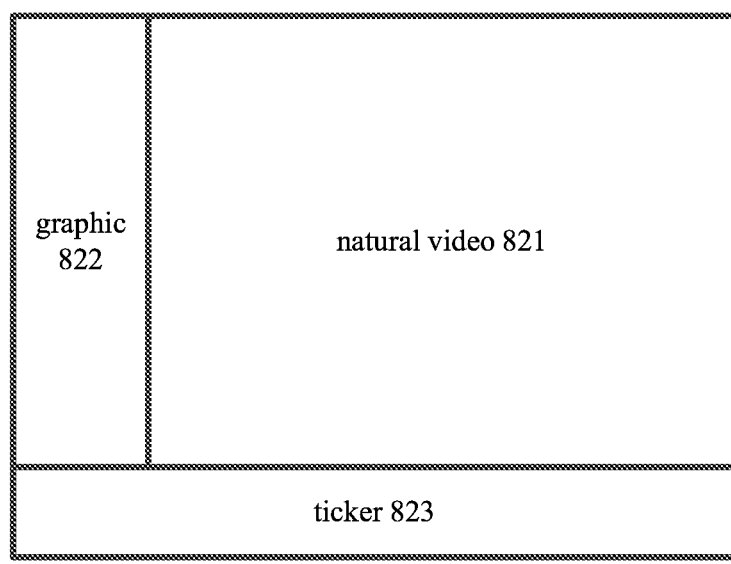
FIG. 8 is a diagram illustrating composite video with natural video content and artificial video content.

FIG. 8 shows composite video (820) that includes natural video (821) and artificially-created video content. The artificially-created video content includes a graphic (822) beside the natural video (821) and ticker (823) running below the natural video (821). Like the screen capture content shown in FIG. 7, the artificially-created video content shown in FIG. 8 tends to have relatively few discrete sample values. It also tends to have distinct structures (e.g., graphics, text characters) that are exactly repeated from frame-to-frame (e.g., due to scrolling).

B. Examples of Adaptive Switching.

For adaptive switching of color spaces, different units of video in a sequence are encoded in different color spaces. For example, some of the units are encoded in a YUV-type color space (e.g., YCbCr, YCoCg), and other units are encoded in an RGB-type color space (e.g., RGB, BGR, GBR). In this case, an encoder or decoder, as appropriate, performs color space transformation operations on sample values to switch between a YUV-type color space and an RGB-type color space. Typically, color space transformation operations can be represented as matrix multiplication operations performed on a position-by-position basis, where n sample values in a first color space for a position are multiplied by an n×n matrix to produce n sample values in a second color space for the position. In practice, color space transformation operations can be implemented using other arithmetic.

As another example of adaptive switching of color spaces, different units can be encoded in different RGB-type color spaces, which differ in terms of their primary component and the order that components are signaled (e.g., for residual data). In this case, an encoder or decoder, as appropriate, performs color space reordering operations on blocks or planes of sample values to change which color component is the primary color component.

In some example implementations, for lossy coding, an encoder can switch between any of the different color spaces. For lossless coding, however, an encoder only performs invertible color space conversions (e.g., reordering color components between RGB, BGR and GBR color spaces, or, in some implementations, conversion to/from YCoCg using an increased intermediate bit depth).

For adaptive switching of color sampling rates, different units of video in a sequence are encoded with different color sampling rates. For example, some of the units are encoded in a 4:2:2 or 4:2:0 format (such as YUV 4:2:2 or YUV 4:2:0), while other units are encoded in a 4:4:4 format (such as YUV 4:4:4). An RGB-type color space usually has a color sampling rate of 4:4:4, but its color components can instead be sub-sampled according to a color sampling rate of 4:2:2 or 4:2:0.

When downsampling sample values for a secondary component horizontally or vertically, an encoder or decoder can perform simple sub-sampling, low-pass filtering plus sub-sampling, or other filtering plus sub-sampling. For corresponding upsampling of the sample values of the secondary component, an encoder or decoder reverses the sub-sampling using, e.g., sample value repetition and/or filtering.

For adaptive switching of bit depths, different units of video in a sequence are encoded with different bit depths. For example, some of the units are encoded with 12-bit sample values, while other units are encoded with 10-bit sample values or 8-bit sample values. When converting between bit depths, an encoder or decoder can truncate higher-bit-depth sample values (with or without addition of a rounding factor) to produce lower-bit-depth sample values, or scale lower-bit-depth sample values to produce higher-bit-depth sample values.

An encoder typically receives input video in a given format such as RGB 4:4:4 with 12-bit sample values. The encoder can convert between the input format and another format (with a different color space, different color sampling rate and/or different bit depth) for a given unit of the video. Color space adaptation can be performed at picture-level, slice-level, block-level or some other level, by itself or in combination with color sampling rate adaptation and/or bit depth adaptation. Similarly, color sampling rate adaptation can be performed at picture-level, slice-level, block-level or some other level, by itself or in combination with color space adaptation and/or bit depth adaptation. Bit depth adaptation can be performed at picture-level, slice-level, block-level or some other level, by itself or in combination with color space adaptation and/or color sampling rate adaptation.

Figure 9:
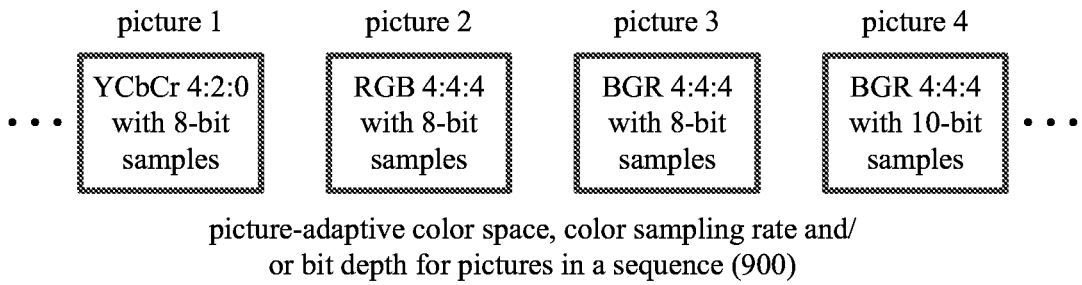
FIG. 9 is a diagram illustrating picture-adaptive color spaces, color sampling rates and/or bit depths for pictures in a sequence.

FIG. 9 shows picture-adaptive color spaces, color sampling rates and/or bit depths for pictures in a sequence (900). The sequence (900) includes a series of pictures. As needed, the encoder converts input video from the input video format to the format selected for a given picture. The format of picture 1 is YCbCr 4:2:0 with 8-bit sample values, and the format of picture 2 is RGB 4:4:4 with 8-bit sample values. Pictures 3 and 4 are BGR 4:4:4 video, but their sample values have different bit depths.

Figure 10:
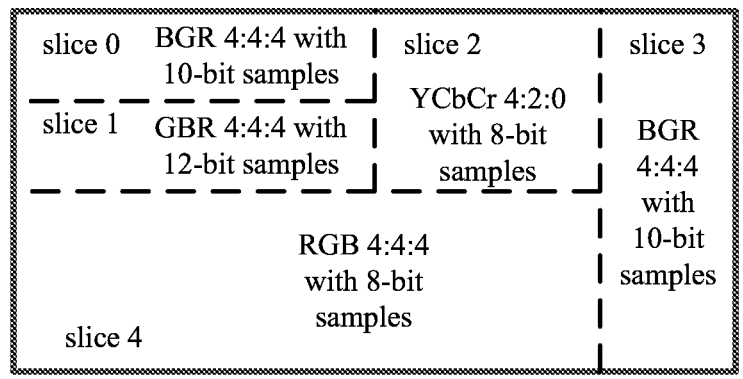
FIG. 10 is a diagram illustrating slice-adaptive color spaces, color sampling rates and/or bit depths for slices of a picture in a sequence.

FIG. 10 shows slice-adaptive color spaces, color sampling rates and/or bit depths for slices of a picture (1000) in a sequence. The picture (1000) includes five slices, whose boundaries are shown in dashed lines. For example, slices 0, 1, 3 and 4 could be associated with screen capture content or other artificially-created video content, while slice 2 is associated with natural video content. The format of slices 0 and 3 is BGR 4:4:4 with 10-bit sample values. Slice 1 includes 12-bit sample values of GBR 4:4:4 video. The format of slice 2 is YCbCr 4:2:0 with 8-bit sample values, and the format of slice 4 is RGB 4:4:4 with 8-bit sample values.

Figure 11:
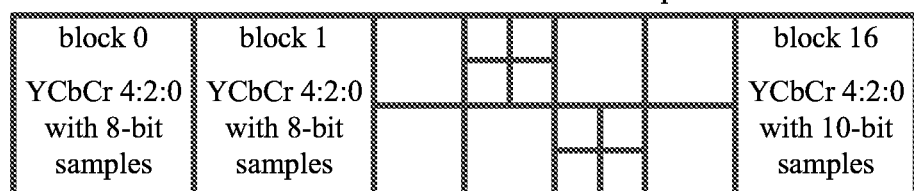
FIG. 11 is a diagram illustrating block-adaptive color spaces, color sampling rates and/or bit depths for blocks of a slice of a picture in a sequence.

FIG. 11 shows block-adaptive color spaces, color sampling rates and/or bit depths for blocks of a slice (1100) of a picture in a sequence. The slice (1100) includes 16 blocks having three different block sizes. The format of the first two blocks is YCbCr 4:2:0 with 8-bit sample values, and the format of the last block is YCbCr 4:2:0 with 10-bit sample values. Blocks 2-15 include 12-bit sample values in an RGB-type color space with a sampling rate of 4:4:4. The color space for blocks 2-15 varies between RGB, BGR and GBR.

C. Examples of Adaptive Switching During Encoding.

Figure 12:
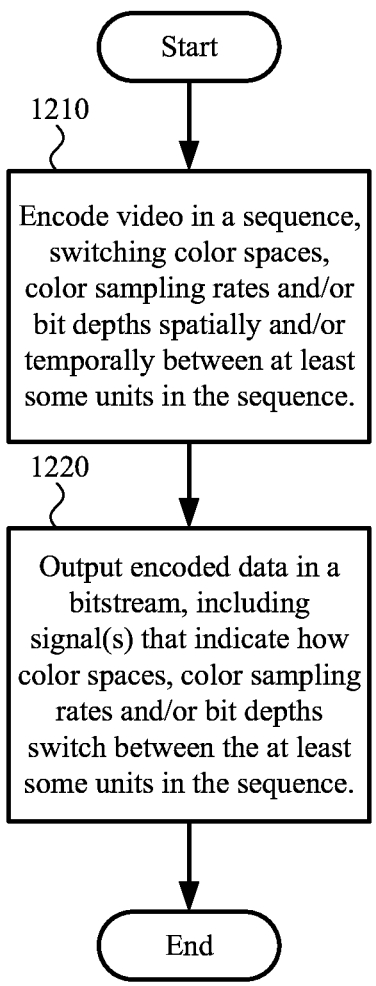
FIG. 12 is a flowchart illustrating a generalized technique for adaptively switching color spaces, color sampling rates and/or bit depths during encoding.

FIG. 12 shows a generalized technique (1200) for adaptively switching color spaces, color sampling rates and/or bit depths during encoding. An image encoder or video encoder such as one described with reference to FIG. 3 or FIGS. 5a-5b can perform the technique (1200).

The encoder encodes (1210) video in a sequence. As part of the encoding, the encoder switches color spaces, color sampling rates and/or bit depths between at least some units of the video within the sequence during the encoding. The encoder can switch color spaces, color sampling rates and/or bit depths spatially within a picture. The encoder can also switch color spaces, color sampling rates and/or bit depths temporally from picture-to-picture. For purposes of adaptive switching, the units of the video can be pictures of the sequence, slices of a given picture of the sequence, blocks of a given picture of the sequence, or other portions of the video sequence.

For example, the switching can include changing between two of the color spaces using color space transformation operations. For color space transformation operations, the color spaces can include at least one YUV-type color space and at least one RGB-type color space. Or, as another example, the switching can include changing between two of the color spaces using color space reordering operations. For color space reordering operations, the color spaces can include multiple RGB-type color spaces. Alternatively, the color spaces include other and/or additional color spaces.

Or, as another example, the switching can include changing between two of the color sampling rates. The color sampling rates can include two or more of 4:4:4, 4:2:2, 4:2:0 and 4:0:0. Alternatively, the color sampling rates include other and/or additional color sampling rates.

Or, as another example, the switching can include changing between two of the bit depths. The bit depths can include two or more of 12 bits per sample, 10 bits per sample and 8 bits per sample. Different color components of a given unit of the video can have the same bit depth or different bit depths. Alternatively, the bit depths include other and/or additional bit depths.

During encoding, the encoder can predict the sample values of a current block in a current picture based at least in part on a set of sample values of previously reconstructed content. For intra-picture prediction, the set of sample values is part of the current picture. For inter-picture prediction, the set of sample values is part of a reference picture. When the sample values of the current block and the set of sample values of previously reconstructed content are in different formats, the encoder can perform conversion operations to facilitate the prediction. Examples of such conversion operations are described in section VII.E.

During encoding, the encoder can also perform adaptive in-loop deblocking for previously reconstructed content according to one or more rules. The rule(s) can account for different color spaces of two adjacent blocks within the previously reconstructed content. Examples of rules for adaptive deblocking are described in section VII.F.

The encoder outputs (1220) encoded data in a bitstream. The encoded data includes one or more signals indicating how the color spaces, the color sampling rates and/or the bit depths switch between the at least some units of the video within the sequence. Examples of syntax elements for the one or more signals are described in section VII.D.

Figure 13:
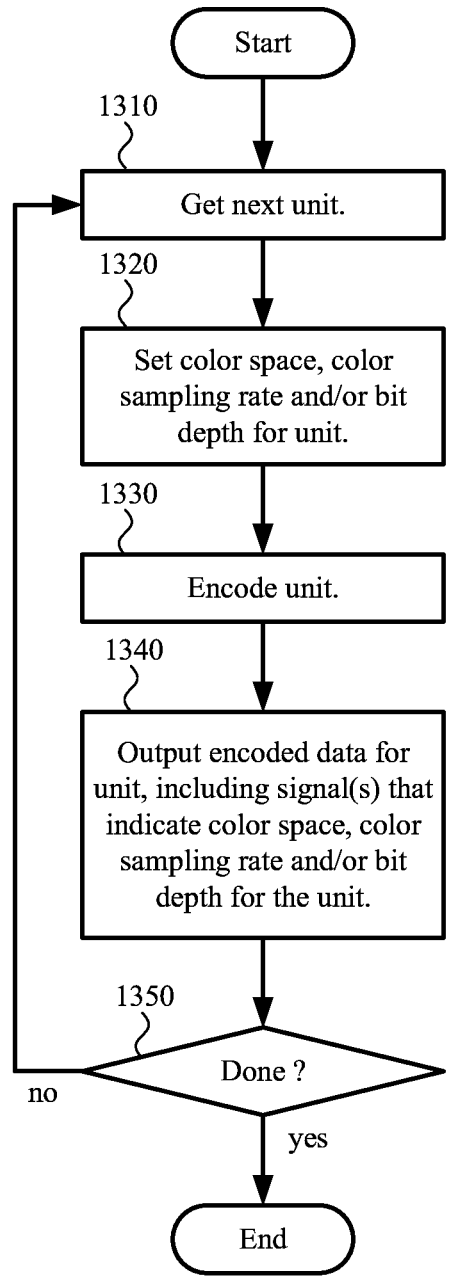
FIG. 13 is a flowchart illustrating a more detailed example technique for adaptively switching on a unit-by-unit basis during encoding.

FIG. 13 shows a more detailed technique (1300) for adaptively switching color spaces, color sampling rates and/or bit depths during encoding. An image encoder or video encoder such as one described with reference to FIG. 3 or FIGS. 5a-5b can perform the technique (1300). In particular, FIG. 13 shows unit-by-unit decisions made by the encoder, but otherwise options for encoding are as described with reference to FIG. 12.

The encoder gets (1310) the next unit (e.g., picture, slice, block) and sets (1320) the color space, color sampling rate and/or bit depth for the unit. As needed, the encoder converts sample values to another color space, color sampling rate and/or bit depth set for the unit, then encodes (1330) the unit. The encoder outputs (1340) encoded data for the unit, including one or more signals that indicate the color space, color sampling rate and/or bit depth for the unit. The encoder checks (1350) whether to continue with the next unit and, if so, gets (1310) the next unit.

C. Examples of Adaptive Switching During Decoding.

FIG. 14 shows a generalized technique (1400) for adaptively switching color spaces, color sampling rates and/or bit depths during decoding. An image decoder or video decoder such as one described with reference to FIG. 4 or FIG. 6 can perform the technique (1400).

The decoder receives (1410) encoded data in a bitstream. The encoded data includes one or more signals that indicate how color spaces, color sampling rates and/or bit depths switch between at least some units of video within a sequence. Examples of syntax elements for the one or more signals are described in section VII.D.

The decoder decodes (1420) video in the sequence. As part of the decoding, the decoder switches color spaces, color sampling rates and/or bit depths between at least some units of the video within the sequence during the decoding. The decoder can switch color spaces, color sampling rates and/or bit depths spatially within a picture. The decoder can also switch color spaces, color sampling rates and/or bit depths temporally from picture-to-picture. For purposes of adaptive switching, the units of the video can be pictures of the sequence, slices of a given picture of the sequence, blocks of a given picture of the sequence, or other portions of the video sequence For example, the switching can include changing between two of the color spaces using color space transformation operations. For color space transformation operations, the color spaces can include at least one YUV-type color space and at least one RGB-type color space. Or, as another example, the switching can include changing between two of the color spaces using color space reordering operations. For color space reordering operations, the color spaces can include multiple RGB-type color spaces. Alternatively, the color spaces include other and/or additional color spaces.

Or, as another example, the switching can include changing between two of the color sampling rates. The color sampling rates can include two or more of 4:4:4, 4:2:2, 4:2:0 and 4:0:0. Alternatively, the color sampling rates include other and/or additional color sampling rates.

Or, as another example, the switching can include changing between two of the bit depths. The bit depths can include two or more of 12 bits per sample, 10 bits per sample and 8 bits per sample. Different color components of a given unit of the video can have the same bit depth or different bit depths. Alternatively, the bit depths include other and/or additional bit depths.

During decoding, the decoder can predict the sample values of a current block in a current picture based at least in part on a set of sample values of previously reconstructed content. For intra-picture prediction, the set of sample values is part of the current picture. For inter-picture prediction, the set of sample values is part of a reference picture. When the sample values of the current block and the set of sample values of previously reconstructed content are in different formats, the decoder can perform conversion operations to facilitate the prediction. Examples of such conversion operations are described in section VII.E.

During decoding, the decoder can also perform adaptive in-loop deblocking for previously reconstructed content according to one or more rules. The rule(s) can account for different color spaces of two adjacent blocks within the previously reconstructed content. Examples of rules for adaptive deblocking are described in section VII.F.

FIG. 15 shows a more detailed technique (1500) for adaptively switching color spaces, color sampling rates and/or bit depths during decoding. An image decoder or video decoder such as one described with reference to FIG. 4 or FIG. 6 can perform the technique (1500). In particular, FIG. 15 shows unit-by-unit decisions made by the decoder, but otherwise options for decoding are as described with reference to FIG. 14.

The decoder gets (1510) encoded data for the next unit (e.g., picture, slice, block). The encoded data includes one or more signals that indicate the color space, color sampling rate and/or bit depth for the unit. The decoder determines (1520) the color space, color sampling rate and/or bit depth for the unit. The decoder decodes (1530) the unit, converting sample values, as needed, from the color space, color sampling rate and/or bit depth set for the unit. The decoder checks (1540) whether to continue with the next unit and, if so, gets (1510) encoded data for the next unit.

D. Examples of Signaling of Adaptive Switching Information.

This section describes examples of signals that indicate how color spaces, color sampling rates and/or bit depths switch between at least some units of video within a sequence. In general, a signal in the bitstream indicates a selection between two or more options for encoding/decoding a unit. For color space adaptation, the signal indicates a selection between two or more color spaces used when encoding/decoding a unit. For color sampling rate adaptation, the signal indicates a selection between two or more color sampling rates used when encoding/decoding a unit. For bit depth adaptation, the signal indicates a selection between two or more bit depths used when encoding/decoding a unit. Different bit depths can be signaled for different color components of a unit.

The signal can be a flag value for a given unit, indicating a selection between two options for color spaces (or color sampling rates, or bit depths) for encoding/decoding the given unit. Or, the signal can be some other syntax element for a given unit (or multiple flags for the given unit), indicating a selection between three or more options for color spaces (or color sampling rates, or bit depths) for encoding/decoding the given unit.

The signal for a given unit can be present at any of various levels of bitstream syntax. For picture-by-picture adaptation, for example, a syntax element indicating a selection of a color space (or color sampling rate, or bit depth) can be part of a PPS. Or, for slice-by-slice adaptation, a syntax element indicating a selection of a color space (or color sampling rate, or bit depth) can be part of a slice header. Or, for block-by-block adaptation, a syntax element indicating a selection of color space (or color sampling rate, or bit depth) can be part of a syntax structure for a block (e.g., CU syntax structure). In general, picture-by-picture adaptation is less flexible than slice-by-slice adaptation or block-by-block adaptation, but uses fewer signaling bits. Block-by-block adaption uses more signaling bits that slice-by-slice adaptation, but is more flexible.

The signal for a given unit can be entropy coded, e.g., using CABAC, or formatted as a fixed length value. The signal for a given unit can be predictively coded. In this case, a delta value for a parameter for the given unit represents a difference between an actual value of the parameter and its predictor. The predictor can be a value of the parameter signaled at a higher syntax level (e.g., as part of an SPS or as another sequence layer parameter). For example, a bit depth value for a current block or slice can be signaled as a delta value relative to an SPS-specified bit depth. Or, the predictor can be based on one or more actual values of the parameter for one or more previous units of the video (e.g., the actual value of the parameter for the last coded unit, or a median of actual values of the parameter in a neighborhood around the given unit). For example, the bit depth for a current block can be signaled as a delta value relative to the bit depth of the previous coded block.

The encoded data can also include information identifying or defining the available color spaces, information identifying or defining the available color sampling rates, and/or information identifying or defining the available bit depths. Such information can be signaled as part of an SPS, PPS, slice header or other structure of bitstream syntax. The available color spaces, color sampling rates or bit depths can be selected from among pre-defined options known to the encoder and the decoder. Or, an encoder can specify a custom color space (or color sampling rate, or bit depth) in the encoded data, for use by the encoder and decoder. For example, the information can include a matrix of values usable for color space transformation operations between two of the color spaces. Specifying a custom option uses more bits but is more flexible than identifying a set of pre-defined options. Another possibility is to use the pre-defined options known to the encoder and the decoder, without any identifying information signaled as part of an SPS, PPS, slice header, etc. This uses no bits for extra information but may lead to less efficient coding of signals when many of the options are not used at all during encoding for a sequence.

The information identifying or defining the available color spaces (or color sampling rates, or bit depths) is used in conjunction with the signals that indicate selections of options for the units of the video. For example, an SPS can include information identifying available color spaces and which color space conversions are permitted for a sequence, and a syntax element per PPS (or slice header, or block syntax structure) indicates a selection from the specified roster of available color spaces. Or, a slice header can include information identifying available color sampling rates, and a syntax element per block syntax structure indicates a selection from the specified roster of available color sampling rates. Or, some combination of the preceding variations can be used. For example, an SPS can indicate a roster of pre-defined color spaces, with a PPS or slice header including a selection of one of the pre-defined color spaces or including information for a custom color space.

In some example implementations, additional rules apply for CU-level signaling of color space indicators. If the current CU is an intra-spatial-predicted CU, a color space indicator can be signaled as part of a CU syntax structure. If the current CU is an intra-BC-predicted CU or inter-picture-predicted CU, a color space indicator can be signaled as part of a CU syntax structure when there is a residual, but color space conversions that only involve reordering (e.g., between RGB, BGR and GBR) are not allowed. In this context, such color space conversions do not improve performance, and bits spent signaling how to reorder color components would be wasted.

E. Examples of Conversion Operations for Prediction.

During encoding or decoding, an encoder or decoder may predict the sample values of a current block in a current picture based at least in part on a set of sample values of previously reconstructed content. For intra-picture prediction, the set of sample values is part of the current picture (e.g., sample values at spatially adjacent positions for intra spatial prediction, or reconstructed sample values of previous blocks for intra BC prediction). For inter-picture prediction, the set of sample values is part of a reference picture. If the sample values of the current block and the set of sample values of previously reconstructed content are in different formats, the encoder or decoder performs conversion operations to facilitate prediction of the sample values of the current block.

For example, if the set of sample values of previously reconstructed content is in the GBR color space, and the current block is encoded in the YCbCr color space, the encoder or decoder can convert the set of sample values of previously reconstructed content to the YCbCr color space before intra-picture prediction or inter-picture prediction using the set of converted sample values.

To simplify implementation, the encoder and decoder can store sample values of previously reconstructed content in a "main" format. The main format provides a common representation for reconstructed content in a particular color space, with a particular color sampling rate and sample values having a particular bit depth. Depending on implementation, the main format can be GBR 4:4:4 with 12-bit sample values, YUV 4:4:4 with 12-bit sample values, or some other combination of color space, color sampling rate and bit depth. The main format is pre-defined for the encoder and the decoder. Alternatively, the main format can be specified by a signal in the bitstream, indicating a color space, color sampling rate and/or bit depth for storage of reconstructed content. The main format can be selected, for example, to be the most common encoding format for units of a video sequence, so as to avoid conversion operations in many cases. Using GBR 4:4:4 with 12-bit sample values as the main format can be efficient for screen capture content when color space switching is common but color sampling rate switching is rare. Using YUV 4:4:4 with 12-bit sample values as the main format can be efficient when color space switching and color sampling rate switching are both common.

Figure 16:
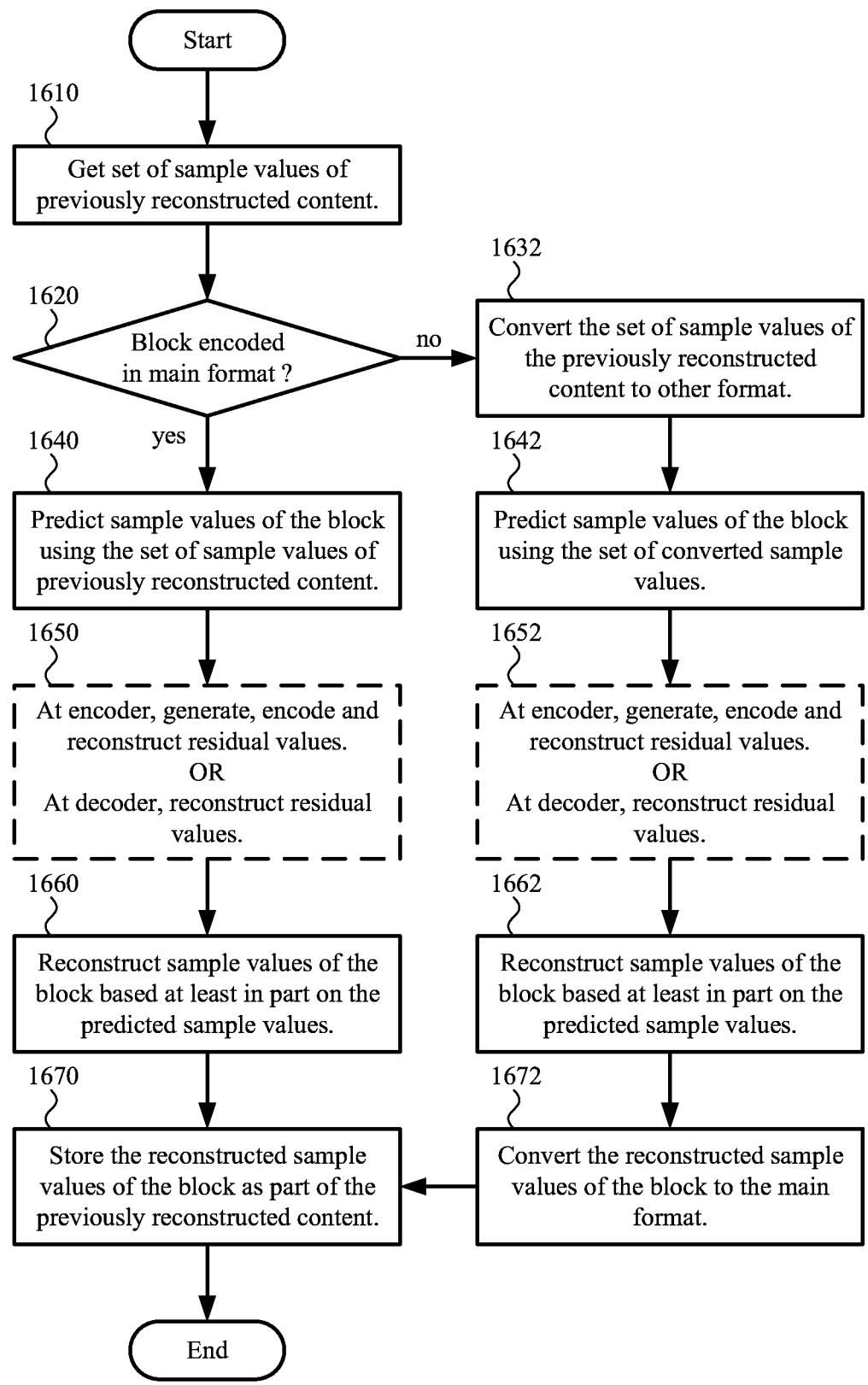
FIG. 16 is a flowchart illustrating a technique for prediction of sample values of a block encoded in one format from a set of sample values of previously reconstructed content in a different format.

FIG. 16 shows a technique (1600) for prediction of sample values of a block encoded in one format from a set of sample values of previously reconstructed content in a different format. An encoder or decoder can perform the technique (1600) during encoding or decoding.

To start, the encoder or decoder gets (1610) a set of sample values of previously reconstructed content that will be used for prediction of the sample values of a current block of a current picture. The set of sample values can be part of the current picture or a reference picture, depending on the type of prediction.

The sample values of previously reconstructed content are stored in a first format (e.g., main format). The encoder or decoder checks (1620) whether the current block is encoded in the first format. More generally, the encoder or decoder evaluates whether the set of sample values of the previously reconstructed content and the sample values of the current block are in different formats.

If the current block is encoded in the first format (e.g., main format), the encoder or decoder need not perform conversion operations before prediction. The encoder or decoder predicts (1640) sample values of the current block using the set of sample values of previously reconstructed content. During encoding, the encoder may then generate, encode and reconstruct (1650) residual values. During decoding, the decoder may reconstruct (1650) residual values. The encoder or decoder then reconstructs (1660) sample values of the current block based at least in part on the predicted sample values. For a non-skipped block, the encoder or decoder can combine the predicted sample values with the reconstructed residual values to produce the reconstructed sample values. The encoder or decoder then stores (1670) the reconstructed sample values of the current block as part of the previously reconstructed content. Since the current block is encoded in the first format (e.g., main format), the encoder or decoder need not perform conversion operations after prediction.

On the other hand, if the current block is not encoded in the first format, the encoder or decoder converts (1632) the set of sample values of the previously reconstructed content from the first format to a second format in which the current block is encoded. For example, if the first and second formats have different color spaces, the encoder or decoder performs color space transformation operations and/or color space reordering operations to change the color space of the set of sample values of previously reconstructed content to the second format. For example, the encoder or decoder can convert a set P of sample values of previously reconstructed content from RGB color space to YCoCg color space as follows.

Suppose the sample values for a position in RGB color space are $Ps_R$, $Ps_G$ and $Ps_B$, respectively, and the current bit depth is $bit\_depth_{current}$. The minimum sample value is 0, and the maximum sample value is $(1<<bit\_depth_{current})-1$ (e.g., 255 for 8-bit sample values). To adjust the dynamic range of Co and Cg, the term add_value is defined as $1<<(bit\_depth_{current}-1)$ (e.g., 128 for 8-bit sample values). The sample values $Ps_Y$, $Ps_{Co}$, and $Ps_{Cg}$ for the position in YCoCg color space can be calculated by:

$$Ps_Y=(Ps_R+(2*Ps_G)+Ps_B)>>2$$

$$Ps_{Co}=((Ps_R-Ps_B)>>1)+\text{add\_value}$$

$$Ps_{Cg}=(((2*Ps_G)-Ps_R-Ps_B)>>2)+\text{add\_value}$$

The sample values $Ps_Y$, $Ps_{Co}$, and $Ps_{Cg}$ are clipped in the range defined by the minimum sample value and maximum sample value.

More generally, the color conversion matrix $CC\_matrix_{1\_to\_2}$ for transformation from a first color space to a second color space can be defined as:

[$c_{00}$, $c_{01}$, $c_{02}$
$c_{10}$, $c_{11}$, $c_{12}$
$c_{20}$, $c_{21}$, $c_{22}$]

To adjust the dynamic range of output, a matrix of offsets $CC\_offsets_{1\_to\_2}$ can be used. The offsets $CC\_offsets_{1\_to\_2}$ can be defined as:

[$o_0$,
$o_1$,
$o_2$]

Suppose the sample values for a position in the first color space are $Ps_{CC1}=[Ps_{00}, Ps_{01}, Ps_{02}]^T$. The sample values $Ps_{CC2}$ for the position in the second color space can be calculated as:

$$Ps_{CC2}=CC\_matrix_{1\_to\_2}*Ps_{CC1}+CC\_offsets_{1\_to\_2}$$

The sample values $Ps_{CC2}$ are clipped to the appropriate range.

Color space reordering operations for the set P of sample values of previously reconstructed content can be implemented by reordering the color components of a block or plane of the sample values, so as to change the order of the primary and secondary color components.

If the first and second formats have different color sampling rates, the encoder or decoder performs downsampling or upsampling (with or without filtering), to change the color sampling rate of the set of sample values of previously reconstructed content to the second format. For example, the encoder or decoder can convert a set P of sample values of previously reconstructed content from 4:4:4 color sampling rate to 4:2:0 color sampling rate as follows.

Suppose the sample values of previously reconstructed content are YUV 4:4:4 sample values. The spatial resolution of the YUV 4:4:4 video is width×height for all color components. After color sampling rate conversion, the spatial resolution of the YUV 4:2:0 video is width×height for the Y component and (width/2)×(height/2) for the U and V components. For each position (i,j), for 0≤i≤width, and 0≤j<height, an encoder or decoder can calculate the sample values for the YUV 4:2:0 video as:

$$Y_{420}[i][j]=Y_{444}[i][j]$$

$$U_{420}[i][j]=(U_{444}[2*i][2*j]+U_{444}[2*i+1][2*j]+U_{444}[2*i][2*j+1]+U_{444}[2*i+1][2*j+1])>>2$$

$$V_{420}[i][j]=(V_{444}[2*i][2*j]+V_{444}[2*i+1][2*j]+V_{444}[2*i][2*j+1]+V_{444}[2*i+1][2*j+1])>>2$$

In this approach, the sample values for the U and V components are determined without filtering. Alternatively, the encoder or decoder can use filtering when obtaining the downsampled U and V components.

If the first and second formats have different bit depths, the encoder or decoder changes the set P of sample values of previously reconstructed content from the bit depth $bit\_depth_{ref}$ to the bit depth $bit\_depth_{current}$ of the sample values of the current block as follows.

```
if bit_depth_ref > bit_depth_current
    shift = bit_depth_ref - bit_depth_current
    add = 1<<(shift - 1)
    P = (P + add) >> shift
else if bit_depth_ref < bit_depth_current
    shift = bit_depth_current - bit_depth_ref
    P <<= shift
```

For example, suppose the bit depth of the first format is 10 bits per sample, the bit depth of the second format is 8 bits per sample, and the current block uses intra spatial prediction. The encoder or decoder obtains the 10-bit sample values of neighboring positions used in intra spatial prediction. The 10-bit sample values are converted to 8-bit sample values, which are then used to generate 8-bit predicted sample values for the current block.

After the conversion (1632), the encoder or decoder predicts (1642) sample values of the current block using the set of converted sample values of previously reconstructed content. During encoding, the encoder may then generate, encode and reconstruct (1652) residual values. During decoding, the decoder may reconstruct (1652) residual values. The encoder or decoder then reconstructs (1662) sample values of the current block based at least in part on the predicted sample values. For a non-skipped block, the encoder or decoder can combine the predicted sample values with the reconstructed residual values to produce the reconstructed sample values.

At this point, the reconstructed sample values of the current block are in the second format. The reconstructed sample values of the current block are converted to the first format before storage as part of the reconstructed content. The encoder or decoder converts (1672) the reconstructed sample values of the current block from the second format to the first format, and stores (1670) the converted, reconstructed sample values of the current block, now in the first format (e.g., main format), as part of the previously reconstructed content.

For example, if the first and second formats have different color spaces, the encoder or decoder performs color space transformation operations and/or color space reordering operations to change the color space of the reconstructed sample values of the current block to the first format. (The color space conversion operations from the second format to the first format generally mirror the earlier color space conversion operations from the first format to the second format.) For example, the encoder or decoder can convert reconstructed sample values R of a current block from YCoCg color space to RGB color space as follows.

Suppose the sample values for a position in YCoCg color space are $Rs_Y$, $Rs_{Co}$ and $Rs_{Cg}$, respectively, and the current bit depth is $bit\_depth_{current}$. To adjust dynamic range, the term add_value is defined as $1<<(bit\_depth_{current}-1)$ (e.g., 128 for 8-bit sample values). The sample values $Rs_R$, $Rs_G$, and $Rs_B$ for the position in RGB color space can be calculated by:

$$Rs_{Co} -= add\_value$$

$$Rs_{Cg} -= add\_value$$

$$Rs_R = Rs_Y + Rs_{Co} - Rs_{Cg}$$

$$Rs_G = Rs_Y + Rs_{Cg}$$

$$Rs_B = Rs_Y - Rs_{Co} - Rs_{Cg}$$

The sample values $Rs_R$, $Rs_G$, and $Rs_B$ are clipped in the range defined by the minimum sample value and maximum sample value.

More generally, the color conversion matrix $CC\_matrix_{2\_to\_1}$ for transformation from a second color space back to a first color space can be defined as:

[$c'_{00}$, $c'_{01}$, $c'_{02}$
$c'_{10}$, $c'_{11}$, $c'_{12}$
$c'_{20}$, $c'_{21}$, $c'_{22}$]

To adjust the dynamic range of output, a matrix of offsets $CC\_offsets_{2\_to\_1}$ can be used. The offsets $CC\_offsets_{2\_to\_1}$ can be defined as:

[$o'_0$,
$o'_1$,
$o'_2$]

Suppose the sample values for a position in the second color space are $Rs_{CC2} = [Rs_{00}, Rs_{01}, Rs_{02}]^T$. The sample values $Rs_{CC1}$ for the position in the first color space can be calculated as:

$$Rs_{CC1} = CC\_matrix_{2\_to\_1} * (Rs_{CC2} + CC\_offsets_{2\_to\_1})$$

The sample values $Rs_{CC1}$ are clipped to the appropriate range.

Color space reordering operations for the reconstructed sample values R can be implemented by reordering the color components of a block or plane of the sample values, so as to change the order of the primary and secondary color components.

If the first and second formats have different color sampling rates, the encoder or decoder performs downsampling or upsampling (with or without filtering), to change the color sampling rate of the reconstructed sample values of the current block to the first format. (The color sampling rate conversion operations from the second format to the first format generally mirror the earlier color sampling rate conversion operations from the first format to the second format.) For example, the encoder or decoder can convert reconstructed sample values R of a current block from 4:2:0 color sampling rate to 4:4:4 color sampling rate by upsampling the downsampled color components.

If the first and second formats have different bit depths, the encoder or decoder changes the reconstructed sample values R of the current block from the bit depth $bit\_depth_{current}$ to the bit depth $bit\_depth_{ref}$ of the sample values of the reconstructed content as follows.

--- if $bit\_depth_{ref} > bit\_depth_{current}$
   shift = $bit\_depth_{ref} - bit\_depth_{current}$
   R <<= shift
else if $bit\_depth_{ref} < bit\_depth_{current}$
   shift = $bit\_depth_{current} - bit\_depth_{ref}$
   add = 1<<(shift − 1)
   R = (R + add) >> shift

---

The encoder or decoder can repeat the technique (1600) for other blocks of a slice or picture.

In FIG. 16, conversion (1632) happens before prediction (1642). Alternatively, for some types of prediction (e.g., intra spatial prediction, intra BC prediction), conversion can follow prediction. In this case, the encoder or decoder predicts the sample values of the current block using the set of sample values of the previously reconstructed content, then converts the predicted sample values of the current block from the first format to the second format. The encoder or decoder reconstructs the sample values of the current block based at least in part on the converted predicted sample values of the current block.

For example, suppose the bit depth of the first format is 10 bits per sample, the bit depth of the second format is 8 bits per sample, and the current block uses intra spatial prediction. The encoder or decoder obtains the 10-bit sample values of neighboring positions used in intra spatial prediction. The 10-bit sample values are used to generate 10-bit predicted sample values, which are then converted to 8-bit sample values.

Alternatively, sample values of units of reconstructed content can be stored in the format in which the units are encoded. Some indication of the encoding formats for the respective units is also stored. Sample values of the reconstructed content are converted to another format, as needed, for prediction.

F. Examples of Deblocking Operations.

During encoding or decoding, an encoder or decoder may perform adaptive in-loop deblocking for previously reconstructed content according to one or more rules. In some cases, deblocking may be applied across a boundary between two blocks encoded with different color spaces.

For example, in some implementations of adaptive deblocking, the strength of a deblocking filter for a boundary between two blocks is based at least in part on whether either of the adjacent blocks has non-zero residual values. When two adjacent blocks have different color spaces, the strength of deblocking filter for the boundary between the blocks can depend on whether primary components of the two adjacent blocks have non-zero residual values. For example, the primary component of the first adjacent block is evaluated, and the primary component of the second adjacent block is evaluated, even though the color spaces are different for the two blocks. The filter strength depends on whether either primary component for the blocks has non-zero residual values.

Alternatively, the rule(s) can account for the different color spaces of the two adjacent blocks. In this case, when two adjacent blocks have different color spaces, the strength of deblocking filter for the boundary between the blocks depends on whether corresponding components of the two adjacent blocks have non-zero residual values. For example, suppose the color space of one adjacent block is GBR, and the color space of the other adjacent block is RGB. Both color spaces are RGB-type color spaces. When determining the filter strength for the G component, the encoder or decoder considers the residual values of the first component (G) of the first block and the residual values of the second component (G) of the second block. This variation of adaptive deblocking can be used for blocks with different RGB-type color spaces.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising one or more processors and memory, wherein the computer system implements a video encoder configured to perform operations comprising:
    encoding video in a sequence, including:
        switching color spaces, color sampling rates and/or bit depths spatially and/or temporally between at least some units of the video within the sequence during the encoding, the color spaces including an RGB-type color space and a YCoCg color space;
        for a given unit of the units of the video, determining a prediction mode of the given unit;
        determining whether or not a condition is satisfied, the condition depending on one or more of the prediction mode of the given unit and whether the given unit has residual values;
        based at least in part on the condition being satisfied, setting a flag value for the given unit, the flag value indicating a selection between the RGB-type color space and the YCoCg color space for the given unit;
        entropy coding the flag value using context-adaptive binary arithmetic coding; and
        selectively performing deblock filtering of previously reconstructed content according to one or more rules, including adjusting strength of the deblock filtering depending on whether primary components of two adjacent blocks have non-zero residual values; and
    outputting encoded data in a bitstream, the encoded data including one or more signals indicating how the color spaces, the color sampling rates and/or the bit depths switch between the at least some units of the video within the sequence, wherein the one or more signals include the flag value for the given unit as part of a syntax structure for the given unit when the prediction mode of the given unit is intra or when the prediction mode of the given unit is inter and the given unit has residual values.

2. The computer system of claim 1, wherein the encoding further includes selecting between:
    for lossy coding, using color space conversion operations to switch between the RGB-type color space and the YCoCg color space; and
    for lossless coding, using invertible color space conversion operations to switch between the RGB-type color space and the YCoCg color space.

3. The computer system of claim 1, wherein the units of the video are coding units of a given picture of the sequence.

4. The computer system of claim 1, wherein different color components of the given unit have different bit depths.

5. The computer system of claim 1, wherein the switching includes performing color space conversion operations between the RGB-type color space and the YCoCg color space for the given unit.

6. The computer system of claim 5, wherein the switching further includes performing right shift operations on at least some results of the color space conversion operations.

7. The computer system of claim 5, wherein the encoding further includes:
    performing prediction operations for the given unit.

8. The computer system of claim 1, wherein the one or more signals also include the flag value as part of the syntax structure for the given unit when the prediction mode of the given unit is intra block copy prediction and the given unit has residual values.

9. A computer system comprising one or more processors and memory, wherein the computer system implements a video decoder system comprising:
    a buffer configured to receive encoded data in a bitstream, the encoded data including one or more signals indicating how color spaces, color sampling rates and/or bit depths switch between at least some units of video within a sequence, the color spaces including an RGB-type color space and a YCoCg color space, wherein the one or more signals include a flag value for a given unit of the units of the video as part of a syntax structure for the given unit when a prediction mode of the given unit is intra or when the prediction mode of the given unit is inter and the given unit has residual values, the flag value having been entropy coded using context-adaptive binary arithmetic coding, and wherein the flag value indicates a selection between the RGB-type color space and the YCoCg color space for the given unit; and
    a video decoder configured to decode the encoded data by performing operations that include:
        for the given unit, determining the prediction mode of the given unit;
        determining whether or not a condition is satisfied, the condition depending on one or more of the prediction mode of the given unit and whether the given unit has residual values;

based at least in part on the condition being satisfied, parsing and entropy decoding the flag value;

switching the color spaces, the color sampling rates and/or the bit depths spatially and/or temporally between the at least some units of the video within the sequence during the decoding; and selectively performing deblock filtering of previously reconstructed content according to one or more rules, including adjusting strength of the deblock filtering depending on whether primary components of two adjacent blocks have non-zero residual values.

10. The computer system of claim 9, wherein the units of the video are coding units of a given picture of the sequence.

11. The computer system of claim 9, wherein different color components of the given unit have different bit depths.

12. The computer system of claim 9, wherein the switching includes performing color space conversion operations between the YCoCg color space and the RGB-type color space for the given unit.

13. The computer system of claim 12, wherein the switching further includes performing left shift operations on at least some results of the color space conversion operations.

14. The computer system of claim 9, wherein the one or more signals also include the flag value as part of the syntax structure for the given unit when the prediction mode of the given unit is intra block copy prediction and the given unit has residual values.

15. One or more non-transitory computer-readable media having stored thereon encoded data in a bitstream, the encoded data including one or more signals indicating how color spaces, color sampling rates and/or bit depths switch between at least some units of video within a sequence, the color spaces including an RGB-type color space and a YCoCg color space, wherein the one or more signals include a flag value for a given unit of the units of the video as part of a syntax structure for the given unit when a prediction mode of the given unit is intra or when the prediction mode of the given unit is inter and the given unit has residual values, the flag value having been entropy coded using context-adaptive binary arithmetic coding, and wherein the flag value indicates a selection between the RGB-type color space and the YCoCg color space for the given unit, the encoded data being organized to facilitate decoding by operations that include:

for the given unit, determining the prediction mode of the given unit;

determining whether or not a condition is satisfied, the condition depending on one or more of the prediction mode of the given unit and whether the given unit has residual values;

based at least in part on the condition being satisfied, parsing and entropy decoding the flag value;

switching the color spaces, the color sampling rates and/or the bit depths spatially and/or temporally between the at least some units of the video within the sequence during the decoding; and selectively performing deblock filtering of previously reconstructed content according to one or more rules, including adjusting strength of the deblock filtering depending on whether primary components of two adjacent blocks have non-zero residual values.

16. The one or more computer-readable media of claim 15, wherein the units of the video are coding units of a given picture of the sequence.

17. The one or more computer-readable media of claim 15, wherein different color components of the given unit have different bit depths.

18. The one or more computer-readable media of claim 15, wherein the switching includes performing color space conversion operations between the YCoCg color space and the RGB-type color space for the given unit.

19. The one or more computer-readable media of claim 18, wherein the switching further includes performing left shift operations on at least some results of the color space conversion operations.

20. The one or more computer-readable media of claim 15, wherein the one or more signals also include the flag value as part of the syntax structure for the given unit when the prediction mode of the given unit is intra block copy prediction and the given unit has residual values.

\* \* \* \* \*